United States Patent
Matsuda

(10) Patent No.: US 10,958,106 B2
(45) Date of Patent: Mar. 23, 2021

(54) CONTROL DEVICE, POWER TRANSMITTING DEVICE, CONTACTLESS POWER TRANSMISSION SYSTEM, POWER RECEIVING DEVICE, AND ELECTRONIC APPARATUS

(71) Applicant: SEIKO EPSON CORPORATION, Tokyo (JP)

(72) Inventor: Kinya Matsuda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/655,920

(22) Filed: Oct. 17, 2019

(65) Prior Publication Data
US 2020/0127495 A1   Apr. 23, 2020

(30) Foreign Application Priority Data
Oct. 18, 2018   (JP) .............................. JP2018-196408

(51) Int. Cl.
| | |
|---|---|
| *H02J 50/12* | (2016.01) |
| *H02J 50/80* | (2016.01) |
| *H02J 50/10* | (2016.01) |
| *H04B 5/00* | (2006.01) |
| *H02J 50/90* | (2016.01) |
| *H02J 5/00* | (2016.01) |

(52) U.S. Cl.
CPC .............. *H02J 50/12* (2016.02); *H02J 5/005* (2013.01); *H02J 50/10* (2016.02); *H02J 50/80* (2016.02); *H02J 50/90* (2016.02); *H04B 5/0037* (2013.01); *H04B 5/0093* (2013.01)

(58) Field of Classification Search
CPC .. H02J 50/12; H02J 50/80; H02J 7/025; H02J 50/10; H02J 50/90; H02M 2001/007; H02M 7/48; H02M 1/08; H04B 5/0037; H04B 5/0093
See application file for complete search history.

(56) References Cited

U.S. PATENT DOCUMENTS

| | | | |
|---|---|---|---|
| 8,884,581 B2 * | 11/2014 | Widmer | B60L 53/122 320/108 |
| 2011/0254377 A1 | 10/2011 | Wildmer et al. | |
| 2011/0254503 A1 | 10/2011 | Widmer et al. | |
| 2013/0241304 A1 * | 9/2013 | Bae | H02J 5/005 307/104 |
| 2016/0118179 A1 * | 4/2016 | Park | H02J 7/00034 320/108 |

(Continued)

FOREIGN PATENT DOCUMENTS

| | | |
|---|---|---|
| JP | 2008-104295 A | 5/2008 |
| JP | 2013-034291 A | 2/2013 |
| JP | 2013-528043 A | 7/2013 |

(Continued)

*Primary Examiner* — Ryan Johnson
(74) *Attorney, Agent, or Firm* — Oliff PLC

(57) ABSTRACT

A control device controls a power transmission driver that transmits power to a power receiving device including a rectifier circuit that is connected to a secondary coil and generates a rectified voltage, by outputting a drive signal to a primary coil. The control device switches the drive mode of the power transmission driver between a full-bridge drive mode and a half-bridge drive mode according to the rectified voltage.

15 Claims, 15 Drawing Sheets

(56) References Cited

U.S. PATENT DOCUMENTS

2017/0104370 A1* 4/2017 Watanabe ............... H02J 50/60
2019/0157910 A1* 5/2019 Choi ................. H02M 7/53871

FOREIGN PATENT DOCUMENTS

| JP | 2014-054134 A | 3/2014 |
| JP | 2015-073432 A | 4/2015 |
| JP | 2015-159668 A | 9/2015 |

* cited by examiner

| address | bit15 | bit14 | bit13 | bit12 | bit11 | bit10 | bit9 | bit8 | bit7 | bit6 | bit5 | bit4 | bit3 | bit2 | bit1 | bit0 |
|---|---|---|---|---|---|---|---|---|---|---|---|---|---|---|---|---|
| ... | | | | | | | | | | | | | | | | |
| ○○○h | | | | VMINSET | | | | | | | | VMAXSET | | | | |
| △△△h | | | | VFH | | | | | | | | VHF | | | | |
| □□□h | | | | VHST | | | | | | | | VFST | | | | AUTO EN |
| ◇◇◇h | | | | | | | | | | | | | | | | |
| ... | | | | | | | | | | | | | | | | |

CONTROL DEVICE, POWER TRANSMITTING DEVICE, CONTACTLESS POWER TRANSMISSION SYSTEM, POWER RECEIVING DEVICE, AND ELECTRONIC APPARATUS

The present application is based on, and claims priority from JP Application Serial Number 2018-196408, filed Oct. 18, 2018, the disclosure of which is hereby incorporated by reference herein in its entirety.

BACKGROUND

1. Technical Field

The present disclosure relates to a control device, a power transmitting device, a contactless power transmission system, a power receiving device, an electronic apparatus, and the like.

2. Related Art

In recent years, much attention has been paid to contactless power transmission in which electromagnetic induction is used to make power transmission possible without a metal contact. Power supply to electronic apparatuses such as a household appliance, a mobile terminal, and an electric car has been proposed as an application example of the contactless power transmission.

A known technology for the contactless power transmission is disclosed in JP-A-2014-54134, for example. In the technology disclosed in JP-A-2014-54134, the drive method of a power transmitting device is switched between a full-bridge drive and a half-bridge drive based on information regarding power consumed in a power receiving device. Also, the power receiving device transmits information regarding the potential of a power receiving side high potential power supply line to the power transmitting device, and the power transmitting device changes a drive voltage, a frequency at which power is transmitted, and a duty ratio based on the information regarding the potential of the power receiving side high potential power supply line.

When a primary coil on a power transmitting side is driven with a half-bridge configuration, in contactless power transmission, a problem arises in that, although excessive power is not transmitted even when a secondary coil comes close to the primary coil, it is disadvantageous with respect to the degree of positional freedom. On the other hand, when the primary coil is driven with a full-bridge configuration, a problem arises in that, although the degree of positional freedom increases, when the secondary coil comes close to the primary coil, excessive power is transmitted, and excessive heat is generated. However, a method of switching the method of driving the power transmitting device between a full-bridge drive and a half-bridge drive based on information regarding the potential of a power receiving side high potential power supply line is not disclosed in JP-A-2014-54134. With the method in JP-A-2014-54134, improvement of the degree of positional freedom and suppression of excessive heat generation cannot be achieved at the same time.

SUMMARY

One aspect of the disclosure relates to a control device that is used in a power transmitting device that includes: a power transmission driver that transmits power, by outputting a drive signal to a primary coil for transmitting power, to a power receiving device including a secondary coil for receiving power and a rectifier circuit that is connected to the secondary coil and generates a rectified voltage; and a power supply voltage control circuit that supplies a power supply voltage to the power transmission driver, and controls the power transmission driver and the power supply voltage control circuit, the control device comprising: a communication circuit configured to receive rectified voltage information, which is information regarding the rectified voltage; and a control circuit configured to switch the drive mode of the power transmission driver between a full-bridge drive mode and a half-bridge drive mode in accordance with the rectified voltage information.

BRIEF DESCRIPTION OF THE DRAWINGS

The disclosure will be described with reference to the accompanying drawings, wherein like numbers reference like elements.

FIG. 10 is a diagram illustrating a register setting of a register.

DESCRIPTION OF EXEMPLARY EMBODIMENTS

Hereinafter, a preferable embodiment of the invention will be described in detail. Note that the embodiment described below is not intended to unduly limit the content of the invention described in the scope of the claims, and not all configurations described in this embodiment are necessarily essential as solving means of the invention.

1. Configuration

Figure 1:
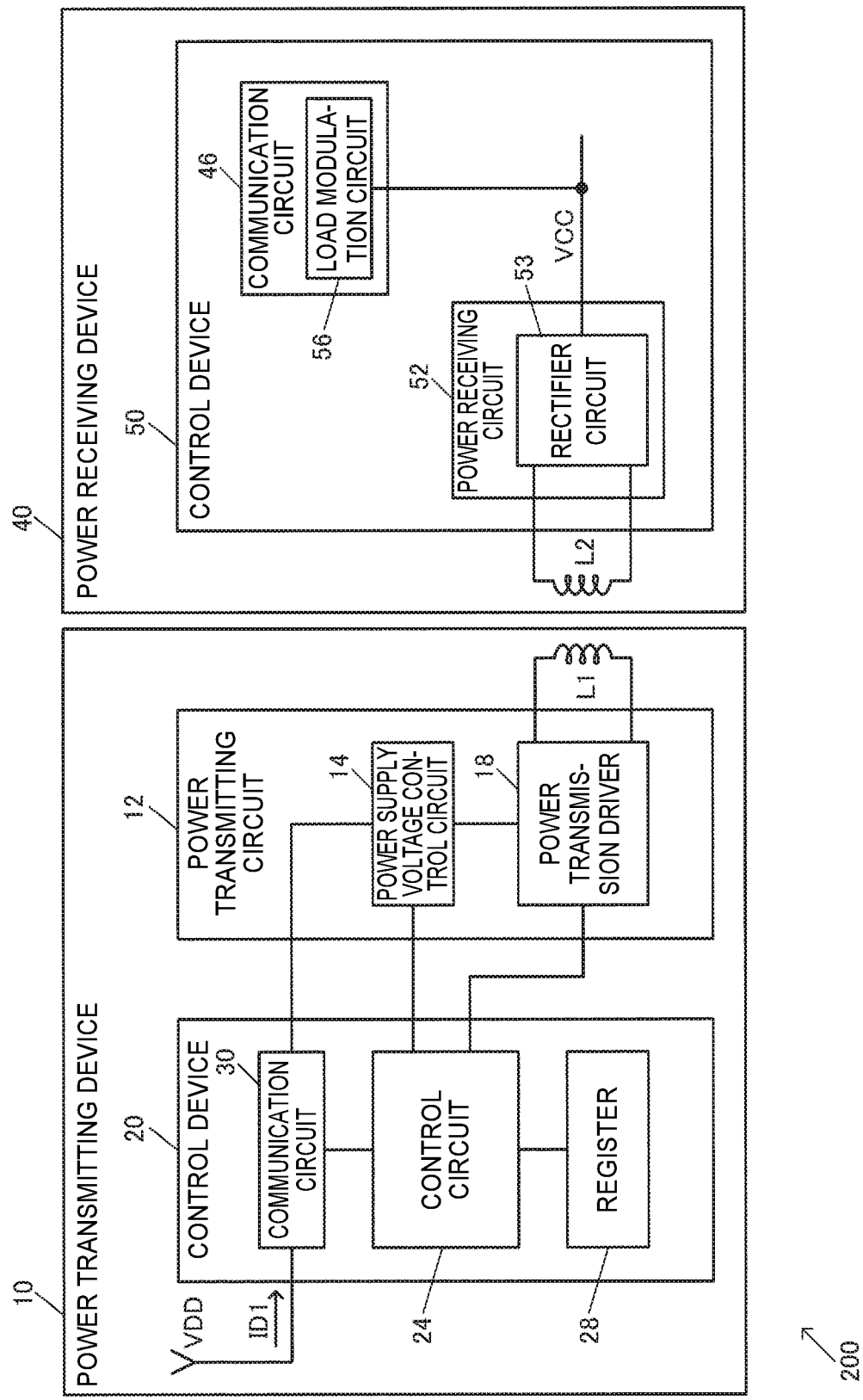
FIG. 1 shows an exemplary configuration of a control device of the present embodiment and a power transmitting device including the control device.

FIG. 1 shows an exemplary configuration of a control device 20 of the present embodiment and a power transmitting device 10 including the control device 20. A contactless power transmission system 200 is constituted by the power transmitting device 10 and a power receiving device 40. Note that the configuration of the control device 20 and the power transmitting device 10 of the present embodiment is not limited to the configuration in FIG. 1, and various modifications can be implemented such as omitting some of the constituent elements or adding other constituent elements.

The power transmitting device 10 includes a primary coil L1 for transmitting power, a power transmitting circuit 12, and the control device 20. The power transmitting device 10 is a device for transmitting power to the power receiving device 40 in a contactless manner. Specifically, the power transmitting device 10 transmits power to the power receiving device 40 with use of electromagnetic coupling between the primary coil L1 and a secondary coil L2. The power receiving device 40 includes the secondary coil L2 and a control device 50. The power receiving device 40 is a device that receives power transmitted from the power transmitting device 10 utilizing the aforementioned electromagnetic coupling, and supplies the received power to a battery and a circuit, for example. The transmitting side control device 20 and the receiving side control device 50 can be realized by semiconductor ICs (Integrated Circuits), for example.

The control device 20 of the power transmitting device 10 includes a control circuit 24 and a communication circuit 30. Also, the control device 20 may further include a register 28. The power transmitting circuit 12 of the power transmitting device 10 includes a power supply voltage control circuit 14 and a power transmission driver 18.

The control device 50 of the power receiving device 40 includes a power receiving circuit 52 and a communication circuit 46. The power receiving circuit 52 includes a rectifier circuit 53, and the communication circuit 46 includes a load modulation circuit 56.

The power receiving circuit 52 receives power transmitted from the power transmission driver 18 via the primary coil L1 and the secondary coil L2. Specifically, the power receiving circuit 52 outputs a rectified voltage VCC by rectifying a signal received by the secondary coil L2 using a rectifier circuit 53.

The communication circuit 46 on the power receiving side transmits communication data from the power receiving device 40 to the power transmitting device 10 with use of load modulation performed by the load modulation circuit 56. Load modulation is a method of modulation in which the amplitude of a current flowing through the primary coil L1 is changed by changing a load on the power receiving side. The communication circuit 30 on the power transmitting side receives communication data from the power receiving device 40 by detecting a current ID1 flowing from a VDD power supply to the power transmission driver 18. That is, the communication circuit 30 receives the communication data by detecting the change in a current amplitude caused by load modulation on the power receiving side. Note that the communication circuit 30 may receive the communication data by monitoring a coil end voltage of the primary coil L1, which changes due to load modulation.

The power supply voltage control circuit 14 controls the voltage amplitude of a drive signal output from the power transmission driver 18, and with this, controls power to be transmitted from the primary coil L1. Specifically, the power supply voltage control circuit 14 regulates a power supply voltage supplied from the VDD power supply, and supplies the regulated power supply voltage to the power transmission driver 18. The communication circuit 30 receives communication data from the power receiving device 40 by detecting a current flowing from the power supply to the power transmission driver 18 via the power supply voltage control circuit 14. Note that the power supply voltage controlled by the power supply voltage control circuit 14 is set based on a set value, which is a register value stored in the register 28.

Also, the control device 20 of the present embodiment in FIG. 1 is used for the power transmitting circuit 12 that includes the power transmission driver 18 and the power supply voltage control circuit 14 that supplies a power supply voltage to the power transmission driver 18, and controls the power transmission driver 18 and the power supply voltage control circuit 14. The power transmission driver 18 is configured to be switchable between a full-bridge drive mode and a half-bridge drive mode, and transmits power to the power receiving device 40 by outputting a drive signal to the primary coil L1 for transmitting power. That is, the power transmission driver 18 transmits power in a contactless manner. The power receiving device 40 includes the secondary coil L2 for receiving power and the rectifier circuit 53 that is connected to the secondary coil L2 and generates a rectified voltage VCC. Specifically, the control device 20 causes the power transmission driver 18 to drive the primary coil L1 by controlling the power transmission driver 18. For example, as shown in later-described FIG. 14, the control circuit 24 controls the power transmission driver 18 via a driver control circuit 22, which is a pre-driver. For example, the control circuit 24 controls the power transmission driver 18 using a drive control signal that is input to a gate of a transistor that constitutes the power transmission driver 18. Also, the control circuit 24 controls the setting of a power supply voltage to be supplied from the power supply voltage control circuit 14 to the power transmission driver 18 by controlling the power supply voltage control circuit 14. This setting of a power supply voltage is controlled based on a set value stored in the register 28.

Also, the control device 20 includes the communication circuit 30 and the control circuit 24. Also, the communication circuit 30 receives communication data from the power receiving device 40 including the secondary coil L2 for receiving power and the rectifier circuit 53 connected to the secondary coil L2. For example, when the load modulation circuit 56 of the communication circuit 46 on the power receiving side transmits communication data by load modulation, the communication circuit 30 on the power transmitting side receives this communication data. For example, the communication circuit 30 receives the communication data by detecting the change in amplitude, by load modulation, of the current ID1 flowing from the power supply to the power transmission driver 18. Note that the communication method of the communication data is not limited to the method in which such load modulation is used. For example, communication may be performed by providing proximity wireless communication devices as the communication circuits 30 and 46, or communication may be performed by providing coils for communication, in addition to the primary coil L1 and the secondary coil L2.

Also, the power transmission driver 18 is configured to be switchable between a full-bridge drive mode and a half-bridge drive mode. For example, as will be described in later-described FIGS. 4 and 5, the power transmission driver 18 has a full-bridge drive mode and a half-bridge drive mode as the drive mode, and the drive mode can be switched between the full-bridge drive mode and the half-bridge drive mode. That is, the power transmission driver 18 can drive the primary coil L1 in the full-bridge drive mode, and can also drive the primary coil L1 in the half-bridge drive mode. Specifically, in the full-bridge drive mode, the power transmission driver 18 causes a drive current to flow in the primary coil L1 in a first current direction, which is a direction from one end side to the other end side of the primary coil L1, in a first period. Also, in a second period subsequent to the first period, the power transmission driver 18 causes the drive current to flow in the primary coil L1 in a second current direction, which is a direction from the other end side to the one end side of the primary coil L1. On the other hand, in the half-bridge drive mode, the power transmission driver 18 causes the drive current to flow in the primary coil L1 in the first current direction, in a third period. In a fourth period subsequent to the third period, the power transmission driver 18 stops the drive current. The switching between the full-bridge drive mode and the half-bridge drive mode can be realized by the setting of a control signal to be input to a gate of a transistor that constitutes the power transmission driver 18, for example.

The communication circuit 30 receives rectified voltage information, which is information regarding a rectified voltage VCC obtained by rectification performed by the rectifier circuit 53 on the power receiving side, as the communication data. That is, the rectifier circuit 53 of the power receiving circuit 52 generates the rectified voltage VCC by rectifying a signal received by the secondary coil L2. Also, the communication circuit 46 on the power receiving side transmits the rectified voltage information, which is information for specifying the rectified voltage VCC. For example, the rectified voltage information is transmitted by load modulation performed by the load modulation circuit 56. The communication circuit 30 on the power transmitting side receives this transmitted rectified voltage information. For example, the rectified voltage information from the power receiving device 40 is received by detecting the current ID1 flowing from the power supply to the power transmission driver 18. Alternatively, rectified voltage information may be received using a proximity wireless communication device or a separate coil for communication.

Also, the control circuit 24 switches between the full-bridge drive mode and the half-bridge drive mode in accordance with the received rectified voltage information. For example, the control circuit 24, if it is determined that the rectified voltage VCC indicated by the rectified voltage information is high, switches the drive mode of the power transmission driver 18 from the full-bridge drive mode to the half-bridge drive mode, and if it is determined that the rectified voltage VCC is low, switches the drive mode from the half-bridge drive mode to the full-bridge drive mode.

As a result of switching between the half-bridge drive mode and the full-bridge drive mode in accordance with the rectified voltage information, in this way, driving control is made possible in which, if the distance between the primary coil L1 and the secondary coil L2 is large, the primary coil L1 is driven in the full-bridge drive mode, and if the distance between the coils is small, the primary coil L1 is driven in the half-bridge drive mode, for example. With this, if the distance between the coils is large, appropriate power transmission is realized by performing the drive in the full-bridge drive mode in which the power transmission capability is high, and the degree of positional freedom with respect to the distance between the coils can be improved. The degree of positional freedom is also referred to as a positional margin. On the other hand, if the distance between the coils is small, excessive heat generation on the power receiving side can be suppressed by performing the drive in the half-bridge drive mode in which power transmission capability is low. Therefore, improvement of the degree of positional freedom and suppression of the heat generation can be achieved at the same time. Note that the control circuit 24 may control switching between the full-bridge drive mode and the half-bridge drive mode directly based on the rectified voltage information, or may control switching between the full-bridge drive mode and the half-bridge drive mode by controlling the setting of the power supply voltage of the power transmission driver 18 that changes in accordance with the rectified voltage information.

For example, the control circuit 24 controls the power supply voltage of the power transmission driver 18 in accordance with the rectified voltage information, and switches between the full-bridge drive mode and the half-bridge drive mode based on the power supply voltage. For example, the control circuit 24 switches between the full-bridge drive mode and the half-bridge drive mode based on the power supply voltage of the power transmission driver 18 that changes in accordance with the rectified voltage information. For example, in the present embodiment, the power supply voltage control circuit 14 performs control such that the power supply voltage to be supplied to the power transmission driver 18 is changed in accordance with the detection result of the communication circuit 30 with respect to the rectified voltage information. For example, the power supply voltage control circuit 14 performs control such that, if it is determined that the rectified voltage VCC on the power receiving side has increased, the power supply voltage to be supplied to the power transmission driver 18 is reduced, and if it is determined that the rectified voltage VCC has decreased, the power supply voltage is increased. Specifically, if the rectified voltage VCC is higher than a first target voltage, the power supply voltage to be supplied to the power transmission driver 18 is reduced, and if the rectified voltage VCC is less than a second target voltage that is lower than the first target voltage, the power supply voltage is increased. That is, the power supply voltage to be supplied to the power transmission driver 18 is controlled such that the rectified voltage VCC is to be constant. Specifically, the power supply voltage is controlled such that the rectified voltage VCC remains in a predetermined voltage range. Also, the control circuit 24 monitors the power supply voltage that is controlled in this way, and switches between the full-bridge drive mode and the half-bridge drive mode based on the power supply voltage.

In this way, as a result of monitoring the power supply voltage while controlling the power supply voltage such that the rectified voltage VCC is to be constant, for example, control of switching between the full-bridge drive mode and the half-bridge drive mode can be realized. With this, compared with a case where the drive mode is switched by directly monitoring the rectified voltage VCC, the drive mode can be appropriately switched with simple control processing.

Also, in the present embodiment, if the power supply voltage has decreased below the first threshold voltage, in the full-bridge drive mode, the control circuit 24 switches the drive mode from the full-bridge drive mode to the half-bridge drive mode. For example, when the distance between the primary coil L1 and the secondary coil L2 decreases, the rectified voltage VCC increases if no control is performed, but in the present embodiment, the power supply voltage control circuit 14 performs control such that the power supply voltage to be supplied to the power transmission driver 18 is reduced. In this way, control such that the rectified voltage VCC is kept constant can be realized. Also, as the distance between the coils decreases, the power supply voltage decreases, and when the power supply voltage has decreased below the first threshold voltage, the control circuit 24 switches the drive mode of the power transmission driver 18 from the full-bridge drive mode to the half-bridge drive mode.

In this way, control such that the drive mode is switched from the full-bridge drive mode to the half-bridge drive mode can be realized by monitoring the power supply voltage that decreases as the distance between the coils decreases. With this, excessive heat generation can be prevented on the power receiving side due to driving in the full-bridge drive mode although the distance between the coils is small.

Also, in the present embodiment, if the power supply voltage has increased above the second threshold voltage, in the half-bridge drive mode, the control circuit 24 switches the drive mode from the half-bridge drive mode to the full-bridge drive mode. For example, when the distance between the primary coil L1 and the secondary coil L2 increases, the rectified voltage VCC decreases if no control is performed, but in the present embodiment, the power supply voltage control circuit 14 performs control such that the power supply voltage to be supplied to the power transmission driver 18 is increased. In this way, control such that the rectified voltage VCC is kept constant can be realized. Also, as the distance between the coils increases, the power supply voltage increases, and when the power supply voltage has increased above the first threshold voltage, the control circuit 24 switches the drive mode of the power transmission driver 18 from the half-bridge drive mode to the full-bridge drive mode.

In this way, control such that the drive mode is switched from the half-bridge drive mode to the full-bridge drive mode can be realized by monitoring the power supply voltage that increases as the distance between the coils increases. With this, as a result of performing driving in the full-bridge drive mode when the distance between the coils has increased, appropriate power transmission is made possible, and the degree of positional freedom with respect to the distance between the coils can be improved.

Also, the power receiving device 40 of the present embodiment receives power from the power transmitting device 10 that includes the primary coil L1 for transmitting power, the power transmission driver 18 configured to be switchable between the full-bridge drive mode and the half-bridge drive mode, and the power supply voltage control circuit 14. The power receiving device 40 includes the secondary coil L2 for receiving power, the rectifier circuit 53 that is connected to the secondary coil L2, and generates the rectified voltage VCC, and the communication circuit 46. Also, the communication circuit 46 transmits an instruction for switching between the full-bridge drive mode and the half-bridge drive mode according to the rectified voltage VCC to the power transmitting device 10. As a result of transmitting such a switching instruction to the power transmitting device 10, the drive mode of the power transmission driver 18 is switched from the full-bridge drive mode to the half-bridge drive mode, or switched from the half-bridge drive mode to the full-bridge drive mode according to the rectified voltage VCC, and therefore improvement of the degree of positional freedom and suppression of the heat generation can be achieved at the same time.

Figure 2:
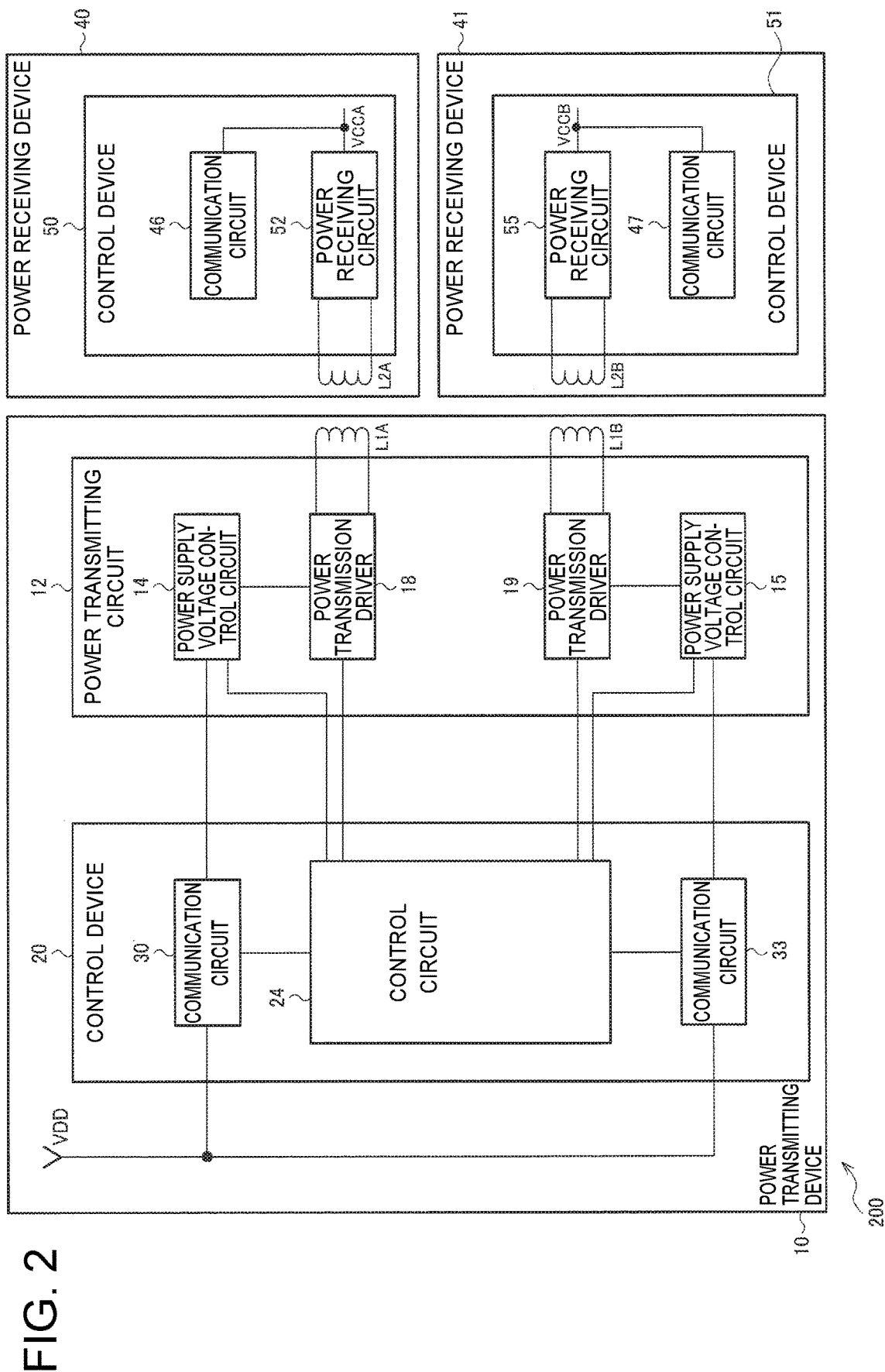
FIG. 2 shows an exemplary configuration of the control device and the power transmitting device when power is transmitted to two power receiving devices.

FIG. 2 shows an exemplary configuration of the control device 20 and the power transmitting device 10 when power is transmitted to two power receiving devices 40 and 41. The power transmitting device 10 includes primary coils L1A and L1B, the power transmitting circuit 12, and the control device 20. The control device 20 includes the control circuit 24 and communication circuits 30 and 33. The power transmitting circuit 12 includes power supply voltage control circuits 14 and 15 and transmission drivers 18 and 19 that are supplied with power supply voltages from the respective power supply voltage control circuits 14 and 15, and respectively drive primary coils L1A and L1B. The power receiving device 40 includes a secondary coil L2A that is to be electromagnetically coupled to the primary coil L1A, and includes the control device 50. The control device 50 includes the power receiving circuit 52 that rectifies a signal received by the secondary coil L2A, and outputs a rectified voltage VCCA, and the communication circuit 46. The power receiving device 41 includes a secondary coil L2B that is to be electromagnetically coupled to the primary coil L1B and a control device 51. The control device 51 includes a power receiving circuit 55 that rectifies a signal received by the secondary coil L2B, and outputs a rectified voltage VCCB, and a communication circuit 47. The primary coil L1A, the secondary coil L2A, and the rectified voltage VCCA respectively correspond to the primary coil L1, the secondary coil L2, and the rectified voltage VCC in FIG. 1.

In FIG. 2, the power transmitting device 10 transmits power to the power receiving device 40 through electromagnetic coupling between the primary coil L1A and the secondary coil L2A, and transmits power to the power receiving device 41 through electromagnetic coupling between the primary coil L1B and the secondary coil L2B. The communication circuits 46 and 47 on the power receiving side transmits communication data to the power transmitting device 10 by load modulation or the like. The communication circuit 30 on the power transmitting side receives communication data from the power receiving device 40 by detecting a current flowing from the power supply to the power transmission driver 18. The communication circuit 33 on the power transmitting side receives communication data from the power receiving device 41 by detecting a current flowing from the power supply to the power transmission driver 19. The control circuit 24 controls the power transmission drivers 18 and 19, and controls the power supply voltage control circuits 14 and 15. With the configuration in FIG. 2, contactless power transmission to the plurality of power receiving devices 40 and 41 can be realized using the one power transmitting device 10. Also, the plurality of transmission drivers 18 and 19 and the like can be controlled by the one control circuit 24.

Also, in the configuration in FIG. 2, the power transmission drivers 18 and 19 are configured to be switchable between the full-bridge drive mode and the half-bridge drive mode. The communication circuit 30 receives information regarding the rectified voltage VCCA in the power receiving device 40, and the communication circuit 33 receives information regarding the rectified voltage VCCB in the power receiving device 41. Also, the control circuit 24 performs control for switching between the full-bridge drive mode and the half-bridge drive mode in the power transmission driver 18 in accordance with information regarding the rectified voltage VCCA in the power receiving device 40. Also, the control circuit 24 performs control for switching between the full-bridge drive mode and the half-bridge drive mode in the power transmission driver 19 in accordance with information regarding the rectified voltage VCCB in the power receiving device 41. In this way, improvement of the degree of positional freedom and suppression of the heat generation can be achieved at the same time, in both of the power receiving devices 40 and 41.

Figure 3:
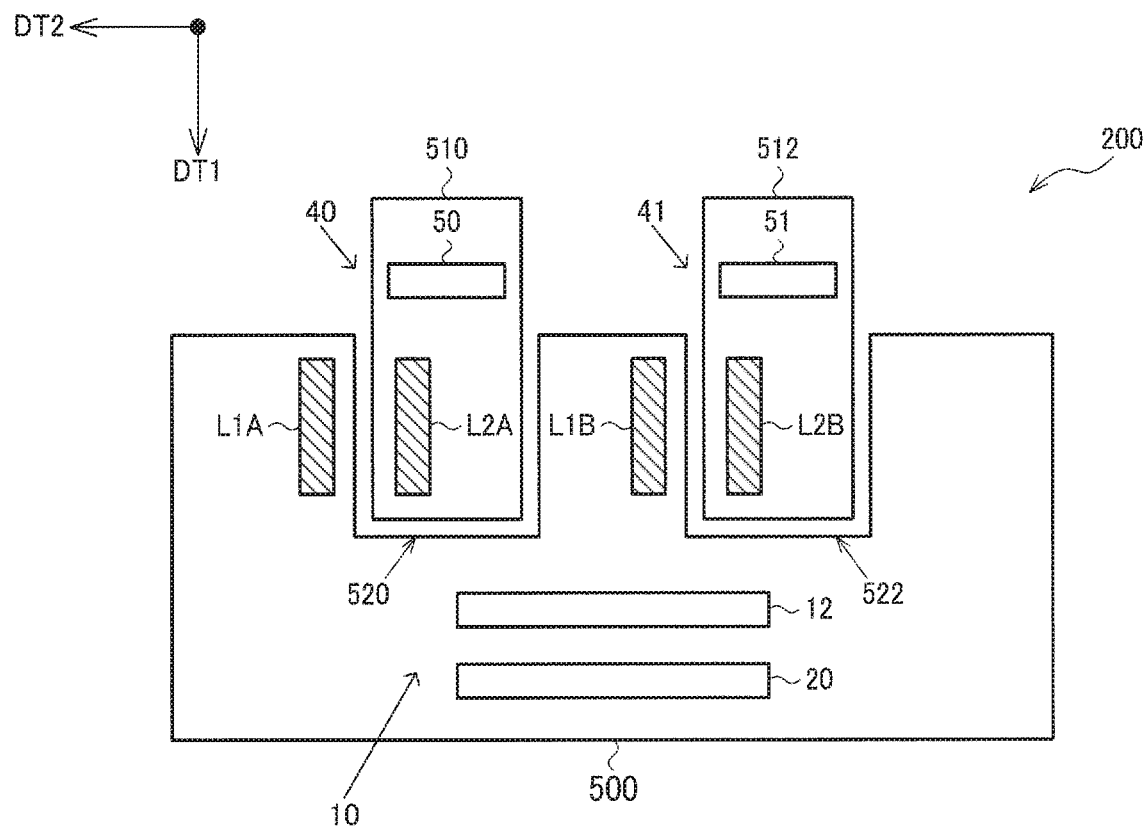
FIG. 3 is an example of a contactless power transmission system of the present embodiment.

FIG. 3 shows an example of the contactless power transmission system 200 of the present embodiment. The contactless power transmission system 200 includes a charger 500, which is an electronic apparatus on a power transmitting side, and electronic apparatuses 510 and 512, which are first and second electronic apparatuses on a power receiving side. The charger 500 includes the power transmitting device 10 that includes the primary coils L1A and L1B, the power transmitting circuit 12, and the control device 20. In this way, the charger 500, which is an electronic apparatus of the present embodiment includes the transmitting side control device 20. Also, the electronic apparatus 510 on the power receiving side includes the power receiving device 40 that includes the secondary coil L2A and the control device 50, and the electronic apparatus 512 on the power receiving side includes the power receiving device 41 that includes the secondary coil L2B and the control device 51.

A placement portion 520 for placing the electronic apparatus 510 that is charged by a power signal from the primary coil L1A, and a placement portion 522 for placing the electronic apparatus 512 that is charged by a power signal from the primary coil L1B are provided in the charger 500. Specifically, two recesses for inserting the electronic apparatuses 510 and 512 are provided side-by-side in a casing of the charger 500, and the two recesses correspond to the placement portions 520 and 522. When the direction in which the electronic apparatuses 510 and 512 are inserted into the recesses is referred to as a first direction D1, the primary coils L1A and L1B are provided in walls of the recesses on a side in a second direction D2 that intersects the first direction D1. The electronic apparatuses 510 and 512 are respectively provided with the secondary coils L2A and L2B. The primary coils L1A and L1B and the secondary coils L2A and L2B are planar coils, for example. When the electronic apparatuses 510 and 512 are inserted into the respective recesses, the primary coils L1A and L1B respectively face the secondary coils L2A and L2B. That is, the axes of the primary coils L1A and L1B and the secondary coils L2A and L2B are substantially parallel to the second direction D2.

Note that the power of the charger 500 may be supplied through USB. Also, various apparatuses can be envisioned as the electronic apparatuses 510 and 512 in FIG. 3. For example, various electronic apparatuses can be envisioned such as a hearing aid, a wireless headphone, a watch, a device for measuring biological information, a mobile information terminal, a cordless telephone, a shaver, an electric toothbrush, a wrist-type computer, a handy terminal, an onboard apparatus, a hybrid car, an electric car, an electric motorcycle, and an electric bicycle. The watch may also be a smart watch, and the device for measuring biological information includes a wearable apparatus that measures a pulse wave or the like. The mobile information terminal may be a smartphone, a cellular phone, or the like. The combination of the electronic apparatuses 510 and 512 may be a combination of the same type of electronic apparatuses, or a combination of different types of electronic apparatuses. For example, the electronic apparatuses 510 and 512 are hearing aids for right and left ears. Alternatively, the electronic apparatuses 510 and 512 are wireless headphones for right and left ears. Alternatively, one of the electronic apparatuses 510 and 512 is a watch or a measurement device for biological information, and the other is a mobile information terminal. Also, the electronic apparatus including the control device 20 of the present embodiment is not limited to the dedicated charger 500, and may also be an apparatus including functions other than the charging function. For example, the control device 20 of the present embodiment can be incorporated into various moving bodies such as a car, an airplane, a motorcycle, a bicycle, and a marine vessel. The moving bodies are apparatuses and devices that include drive mechanisms such as a motor and an engine, steering mechanisms such as a steering wheel and a rudder, and various electronic apparatuses, which are onboard apparatuses, and travel on the ground, through the air, and on the sea, for example. In this case, an electronic apparatus included in the moving body is the electronic apparatus including the control device 20 of the present embodiment.

Figure 4:
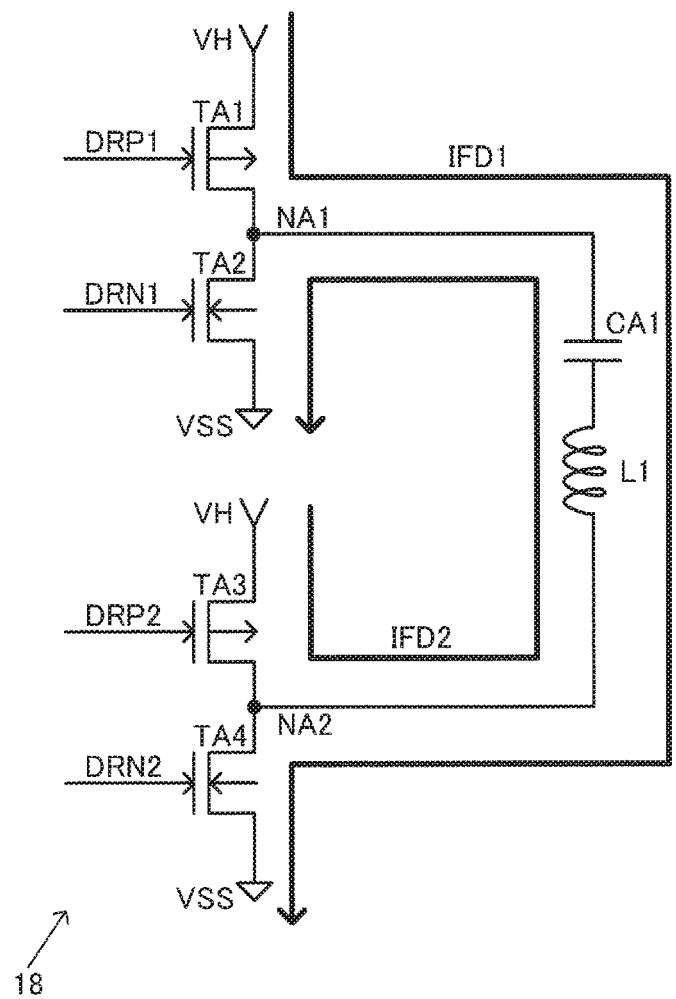
FIG. 4 is a diagram illustrating a full-bridge drive mode of a power transmission driver.
Figure 5:
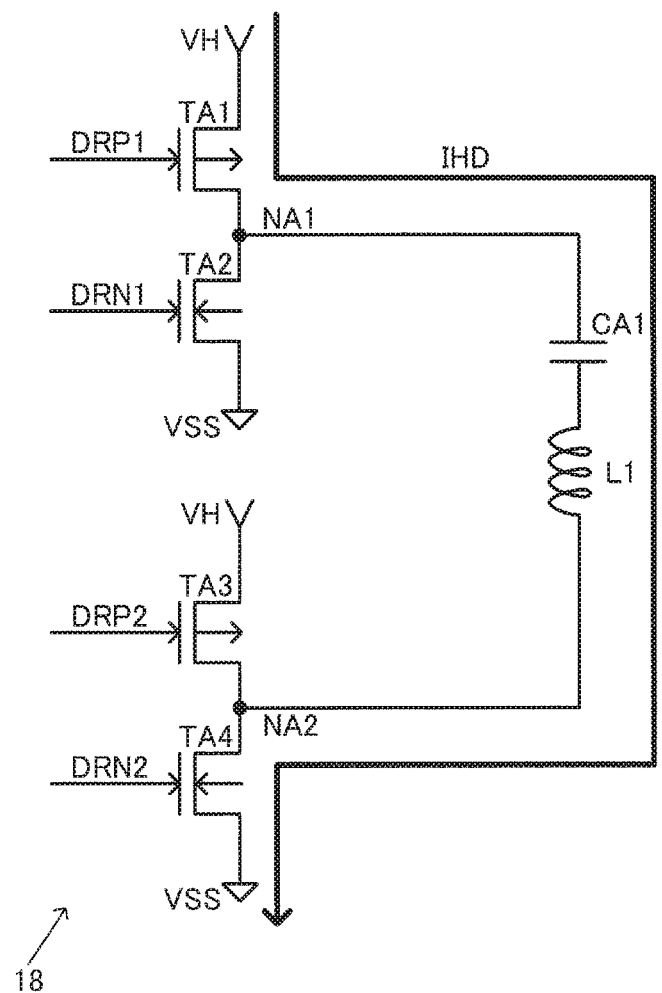
FIG. 5 is a diagram illustrating a half-bridge drive mode of the power transmission driver.

FIG. 4 is a diagram illustrating the full-bridge drive mode of the power transmission driver 18, and FIG. 5 is a diagram illustrating the half-bridge drive mode. The power transmission driver 18 includes transistors TA1, TA2, TA3, and TA4. The transistors TA1, TA2, TA3, and TA4 are respectively a first transistor, a second transistor, a third transistor, and a fourth transistor. For example, the transistors TA1 and TA3 are P-type transistors, and the transistors TA2 and TA4 are N-type transistor.

The transistor TA1 is connected between a VH node, which is a high potential side power supply node, and a connection node NA1 to which one end of the primary coil L1 is coupled. Specifically, the one end of the primary coil L1 and the connection node NA1 are connected via a capacitor CA1. The connection node NA1 is a first connection node, and VH indicates a power supply voltage that the power supply voltage control circuit 14 supplies to the power transmission driver 18. The transistor TA2 is connected between the connection node NA1 and a VSS node, which is a low potential side power supply node. The transistors TA1 and TA2 are provided in series between the VH node and the VSS node. The transistor TA3 is connected between the VH node and a connection node NA2 to which the other end of the primary coil L1 is connected. The connection node NA2 is a second connection node. The transistor TA4 is connected between the connection node NA2 and the VSS node.

Also, the control circuit 24, in the full-bridge drive mode, turns on the transistors TA1 and TA4 in a first period, and performs control such that a drive current IFD1 is caused to flow from the VH node to the VSS node via the transistor TA1, the primary coil L1, and the transistor TA4, as shown in FIG. 4. Here, the transistors TA2 and TA3 are turned off. Also, the control circuit 24 turns on the transistors TA2 and TA3, in a second period, and performs control such that a drive current IFD2 is caused to flow from the VH node to the VSS node via the transistor TA3, the primary coil L1, and the transistor TA2. Here, the transistors TA1 and TA4 are turned off. In this way, in the first period, the drive current IFD1 flows through the primary coil L1 in a first current direction, and in the second period, the drive current IFD2 flows through the primary coil L1 in a second current direction, which is opposite to the first current direction, and as a result, the full-bridge drive mode can be realized. The second period is a period subsequent to the first period, and the first period and the second period are alternately repeated. Note that an overlap period may be present between the first period and the second period.

On the other hand, in the half-bridge drive mode, the control circuit 24 turns on the transistors TA1 and TA4, in a third period, and performs control such that a drive current IHD is caused to flow from the VH node to the VSS node via the transistor TA1, the primary coil L1, and the transistor TA4, as shown in FIG. 5. Also, in a fourth period, the control circuit 24 turns off the transistors TA1 and TA4. In this way, the drive current IHD flows through the primary coil L1 in the first current direction, only in the third period, and as a result, the half-bridge drive mode can be realized. Note that the fourth period is a period subsequent to the third period, and the third period and the fourth period are alternatingly repeated.

For example, control signals DRP1, DRN1, DRP2, and DRN2 are input to respective gates of the transistors TA1, TA2, TA3, and TA4. The control signals DRP1, DRN1, DRP2, and DRN2 are signals that are set by the control circuit 24, and specifically are signals that are output from the driver control circuit 22 in FIG. 14, which will be described later. In the full-bridge drive mode, the transistors TA1 and TA4 are turned on by activating the control signals DRP1 and DRN2 in the first period, and the transistors TA2 and TA3 are turned on by activating the control signals DRN1 and DRP2, in the second period. On the other hand, in the half-bridge drive mode, the transistors TA1 and TA4 are turned on by activating the control signals DRP1 and DRN2, in the third period, and the transistors TA1 and TA4 are turned off by deactivating the control signals DRP1 and DRN2, in the fourth period.

In this way, with the power transmission driver 18 in FIGS. 4 and 5, as a result of controlling ON/OFF of the transistors TA1, TA2, TA3, and TA4 using the control signals DRP1, DRN1, DRP2, and DRN2, the drive in the full-bridge drive mode and the drive in the half-bridge drive mode can be realized with a simple configuration and sequence, and switching between these drive modes can be realized.

2. Switching of Drive Mode

Figure 6:
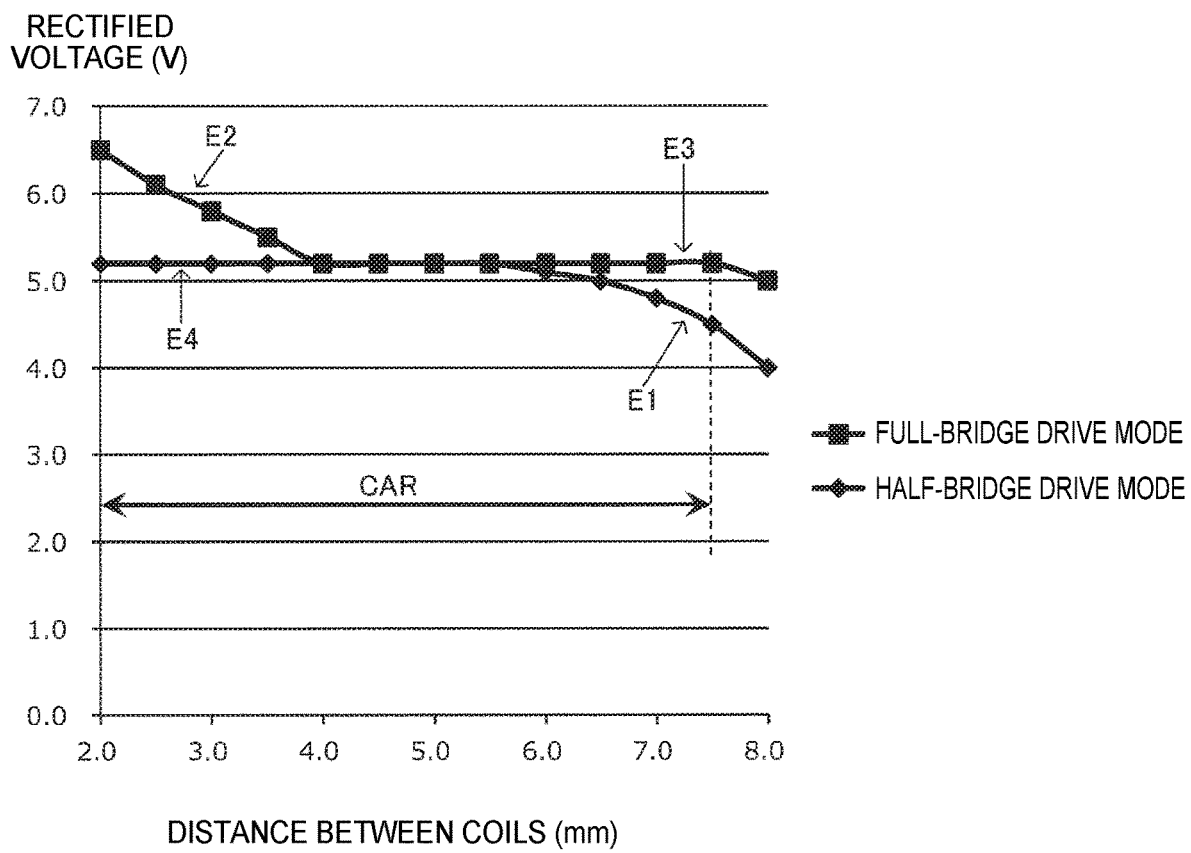
FIG. 6 is a diagram illustrating the relationship between a distance between coils and a rectified voltage in the full-bridge drive mode and the half-bridge drive mode.

FIG. 6 is a diagram illustrating a relationship between a distance between coils and a rectified voltage in the full-bridge drive mode and the half-bridge drive mode. As indicated by E1 in FIG. 6, when the distance between coils increases, the rectified voltage VCC decreases in the half-bridge drive mode, the transmitting power decreases, and the degree of positional freedom decreases. Therefore, there is a problem in that power control such that the reduction of transmitting power can be suppressed in a wide control range CAR cannot be realized. On the other hand, as indicated by E2 in FIG. 6, when the distance between the primary coil L1 and the secondary coil L2 decreases, the rectified voltage VCC cannot be kept constant and increases, in the full-bridge drive mode. In a state in which the rectified voltage VCC is high, as mentioned above, surplus power changes to heat, and heat is generated in an IC of the receiving side control device 50.

Figure 7:
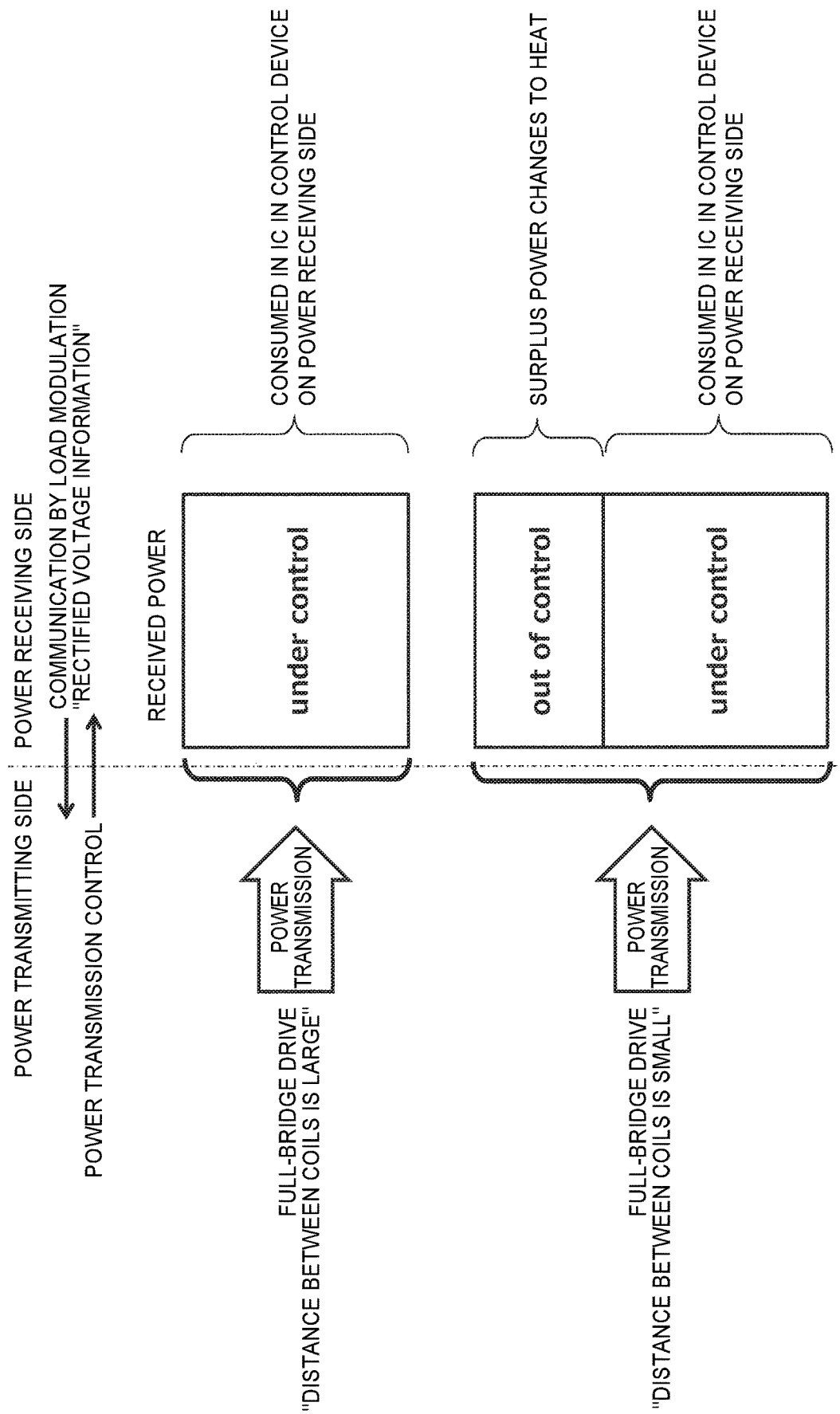
FIG. 7 is a diagram illustrating a problem of heat generation due to surplus power in the full-bridge drive mode.

FIG. 7 is a diagram illustrating a problem of heat generation due to surplus power in the full-bridge drive mode. Rectified voltage information is transmitted from the power receiving side to the power transmitting side by load modulation, and the power transmitting side controls the transmitting power using the received rectified voltage information. Also, in the full-bridge drive mode, when the distance between the coils is large, the received power is consumed in an IC of the receiving side control device 50. However, when the distance between the coils decreases, some of the received power is not consumed in the IC of the control device 50, which is surplus power that changes to heat, and accordingly, heat is generated on the power receiving side. Such heat generation on the power receiving side is an unfavorable situation in the contactless power transmission system 200 as shown in FIG. 3. On the other hand, when the degree of positional freedom with respect to the distance between the coils is low when the electronic apparatuses 510 and 512, which are a hearing aid, an earphone, and the like, are charged by the charger 500, there is a problem in that, if the positions of the electronic apparatuses 510 and 512 in the placement portions 520 and 522 shift, power cannot be appropriately transmitted.

Figure 8:
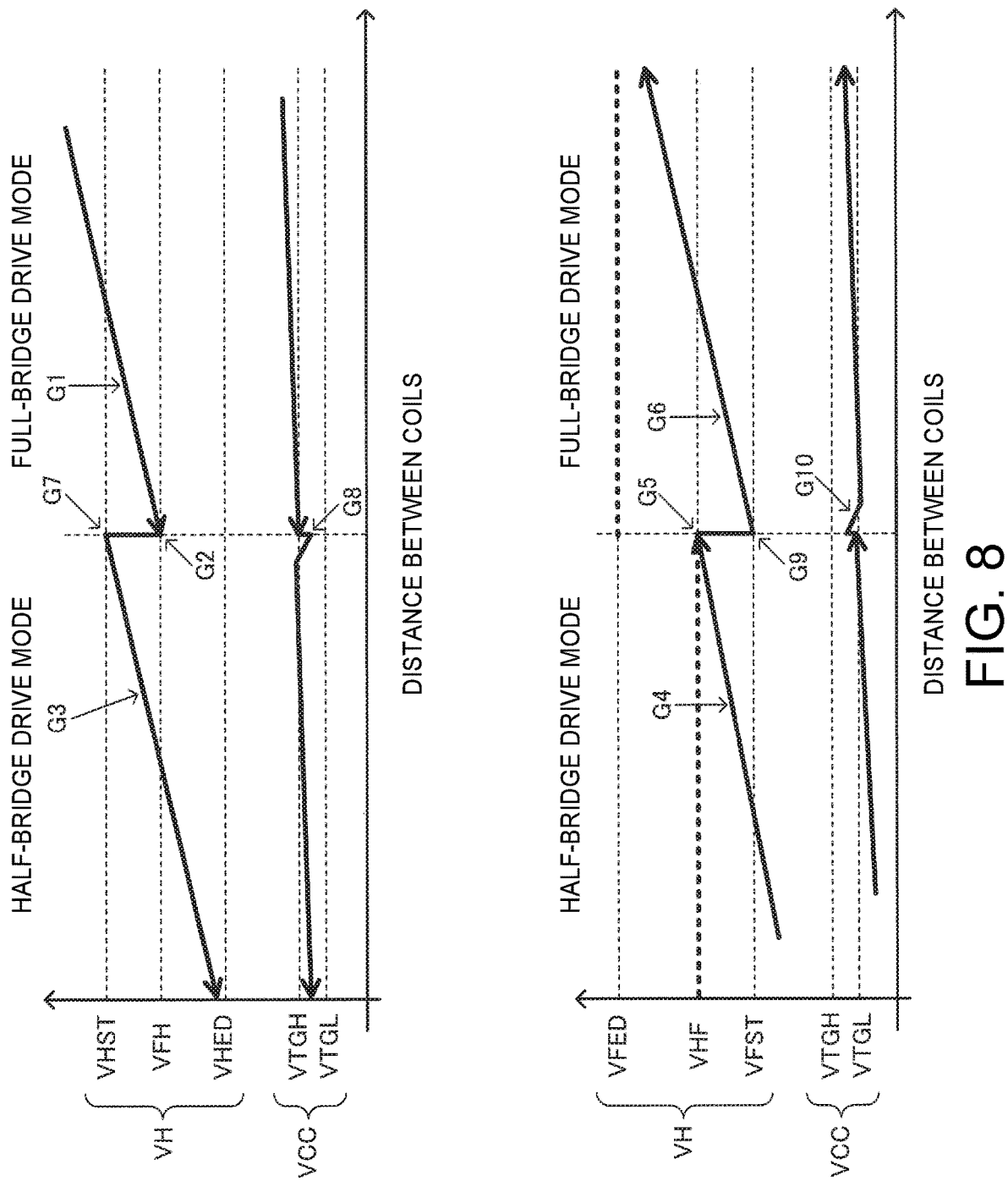
FIG. 8 is a diagram illustrating a method of switching between the full-bridge drive mode and the half-bridge drive mode.

Therefore, in the present embodiment, the rectified voltage information on the power receiving side is received as communication data, and the drive mode is switched between the full-bridge drive mode and the half-bridge drive mode in accordance with the rectified voltage information. FIG. 8 is a diagram illustrating a method of switching between the full-bridge drive mode and the half-bridge drive mode.

In a range indicated by G1 in FIG. 8, drive in the full-bridge drive mode is performed. When the distance between the coils decreases, the power supply voltage VH to be supplied to the power transmission driver 18 is controlled such that the rectified voltage VCC is kept constant. Specifically, the power supply voltage VH is controlled such that the rectified voltage VCC is a voltage in the vicinity of the target voltage VTGH. With this, as indicated by G1, the power supply voltage VH decreases as the distance between the coils decreases.

Also, in a range indicated by G4 in FIG. 8, drive in the half-bridge drive mode is performed. When the distance between the coils increases, the power supply voltage VH is controlled such that the rectified voltage VCC is kept constant. Specifically, the power supply voltage VH is controlled such that the rectified voltage VCC is a voltage in the vicinity of the target voltage VTGL. With this, as indicated by G4, the power supply voltage VH increases as the distance between the coils increases.

Also, in the present embodiment, control of switching between the full-bridge drive mode and the half-bridge drive mode is performed based on the power supply voltage VH of the power transmission driver 18 that changes in accordance with the rectified voltage information. Specifically, as indicated by G2 in FIG. 8, when the power supply voltage VH has decreased below a threshold voltage VFH in the full-bridge drive mode, the drive mode is switched from the full-bridge drive mode to the half-bridge drive mode. The threshold voltage VFH is a first threshold voltage, and is a judgement voltage for switching from the full-bridge drive mode to the half-bridge drive mode. Also, in a range indicated by G3, the power supply voltage VH is controlled based on the rectified voltage information, in the half-bridge drive mode. Specifically, the power supply voltage VH is controlled such that, when the distance between the coils decreases, the rectified voltage VCC is kept constant.

Also, as indicated by G5 in FIG. 8, when the power supply voltage VH has increased above a threshold voltage VHF, in the half-bridge drive mode, the drive mode is switched from the half-bridge drive mode to the full-bridge drive mode. The threshold voltage VHF is a second threshold voltage, and is a judgement voltage for switching from the half-bridge drive mode to the full-bridge drive mode. Also, in a range indicated by G6, power supply voltage VH is controlled based on the rectified voltage information, in the full-bridge drive mode. Specifically, the power supply voltage VH is controlled such that, when the distance between the coils increases, the rectified voltage VCC is kept constant.

In this way, according to the present embodiment, when the distance between the coils is large, the primary coil L1 is driven in the full-bridge drive mode, as indicated by G1 and G6 in FIG. 8, and as a result, the degree of positional freedom can be improved. That is, as indicated by E1 in FIG. 6, in the half-bridge drive mode, when the distance between the coils is large, control cannot be performed such that the rectified voltage VCC is kept constant. In contrast, as indicated by E3, with the full-bridge drive mode, even in a case where the distance between the coils is large, the rectified voltage VCC can be kept constant. Therefore, with the method of the present embodiment in which the drive mode is switched from the half-bridge drive mode to the full-bridge drive mode when the distance between the coils increases, the control range CAR in FIG. 6 can be increased, and the degree of positional freedom can be improved.

Also, according to the present embodiment, when the distance between the coils is small, the primary coil L1 is driven in the half-bridge drive mode as indicated by G3 and G4 in FIG. 8, and as a result, heat generation on the power receiving side can be suppressed. That is, as indicated by E2 in FIG. 6, in the full-bridge drive mode, when the distance between the coils is small, the rectified voltage VCC increases, and heat is generated on the power receiving side as a result of surplus power changing to heat. In contrast, as indicated by E4, with the half-bridge drive mode, even in a case where the distance between coils is small, the rectified voltage VCC can be kept constant, and the heat generation can be suppressed. Therefore, with the method of the present embodiment in which the drive mode is switched from the full-bridge drive mode to the half-bridge drive mode when the distance between the coils decreases, the occurrence of the situation in which heat is generated as a result of surplus power changing to heat can be suppressed.

In an apparatus that can wirelessly supply power using contactless power transmission, for example, because of the fact that a user can easily perform a charging operation increases the commercial value of the apparatus, there are cases where the structure is configured such that the engagement between the charger 500 and the electronic apparatuses 510 and 512 in FIG. 3 is loose. For example, in FIG. 3, the placement portions 520 and 522, which are sockets for respectively housing the electronic apparatuses 510 and 512, are provided in the charger 500, and the structure is configured such that the widths and the like of the recesses of the placement portions 520 and 522 are larger than those of the electronic apparatuses 510 and 512. However, when such a structure is adopted, there are cases where the distance between the coils changes due to the electronic apparatuses 510 and 512 inclining inside the placement portions 520 and 522, which are sockets. For example, when an object has struck a table on which the charger 500 is placed, or an earthquake or the like occurs, the electronic apparatuses 510 and 512 move inside the placement portions 520 and 522, and as a result, the distance between the coils changes. In such a case as well, according to the present embodiment, heat generation is suppressed, and the degree of positional freedom increases, and as a result, a case where charging is stopped due to heat generation, and a case where power is not sufficiently transmitted can be prevented from occurring, and stable wireless charging is possible. Also, in the present embodiment, even in a case where the distance between the electronic apparatuses 510 and 512 and the charger 500 has increased while charging is performed, as a result of the drive mode switching to the full-bridge drive mode, the amount of power to be transmitted can be increased. Therefore, a situation can be prevented in which although the electronic apparatuses 510 and 512 were set to the charger 500 in the previous night, charging is still insufficient in the morning, for example. Specifically, it is not favorable for a user that a hearing aid is not sufficiently charged. It is because the hearing aid is a wearable apparatus, and cannot be charged using a mobile battery or the like when away from the user's home. Also, when the drive mode is switched based on the power supply voltage VH instead of the rectified voltage itself, the switching of the drive mode can be easily determined. Also, according to the present embodiment, since the degree of positional freedom or the like is high, even when the power is supplied through USB, there is an advantage that rapid charging or the like is possible.

Also, in the present embodiment, before the drive mode is switched from the full-bridge drive mode to the half-bridge drive mode as indicated by G2 in FIG. 8, the power supply voltage VH is set to a voltage VHST that is higher than the threshold voltage VFH, as indicated by G7. The voltage VHST is a first voltage, and a start voltage of the power supply voltage VH when the drive mode is switched from the full-bridge drive mode to the half-bridge drive mode. When the drive mode is switched from the full-bridge drive mode having a high power transmission capability to the half-bridge drive mode having a low power transmission capability, a phenomenon occurs in which, because the received power suddenly decreases, the rectified voltage VCC suddenly decreases. Such a rapid reduction in the rectified voltage VCC is not preferable for supplying power to a battery or the like on the power receiving side, and hinders stable power supply. Therefore, in the present embodiment, before the drive mode is switched from the full-bridge drive mode to the half-bridge drive mode, the power supply voltage VH is set to the voltage VHST that is higher than the threshold voltage VFH, as indicated by G7. Also, control of the power supply voltage VH, in which the voltage VHST is a start voltage, based on the rectified voltage information is started. In this way, a situation in which the rectified voltage VCC suddenly decreases when the drive mode is switched from the full-bridge drive mode to the half-bridge drive mode can be suppressed, as indicated by G8, and a stable power supply on the power receiving side can be realized.

Also, in the present embodiment, before the drive mode is switched from the half-bridge drive mode to the full-bridge drive mode as indicated by G5, the power supply voltage VH is set to a voltage VFST that is lower than the threshold voltage VHF, as indicated by G9. The voltage VFST is a second voltage, and a start voltage of the power supply voltage VH when the drive mode is switched from the half-bridge drive mode to the full-bridge drive mode. When the drive mode is switched from the half-bridge drive mode having a low power transmission capability to the full-bridge drive mode having a high power transmission capability, a phenomenon occurs in which, because the received power suddenly increases, the rectified voltage VCC suddenly increases. Such a rapid increase in the rectified voltage VCC is not preferable for supplying power to a battery or the like on the power receiving side, and hinders stable power supply. Therefore, in the present embodiment, before the drive mode is switched from the half-bridge drive mode to the full-bridge drive mode, the power supply voltage VH is set to the voltage VFST that is lower than the threshold voltage VHF, as indicated by G9. Also, control of the power supply voltage VH, in which the voltage VFST is a start voltage, based on the rectified voltage information is started. In this way, a situation in which the rectified voltage VCC suddenly increases when the drive mode is switched from the half-bridge drive mode to the full-bridge drive mode can be suppressed, as indicated by G10, and a stable power supply on the power receiving side can be realized. Also, a situation in which the rectified voltage VCC becomes an over-voltage on the power receiving side can be prevented.

Figure 9:
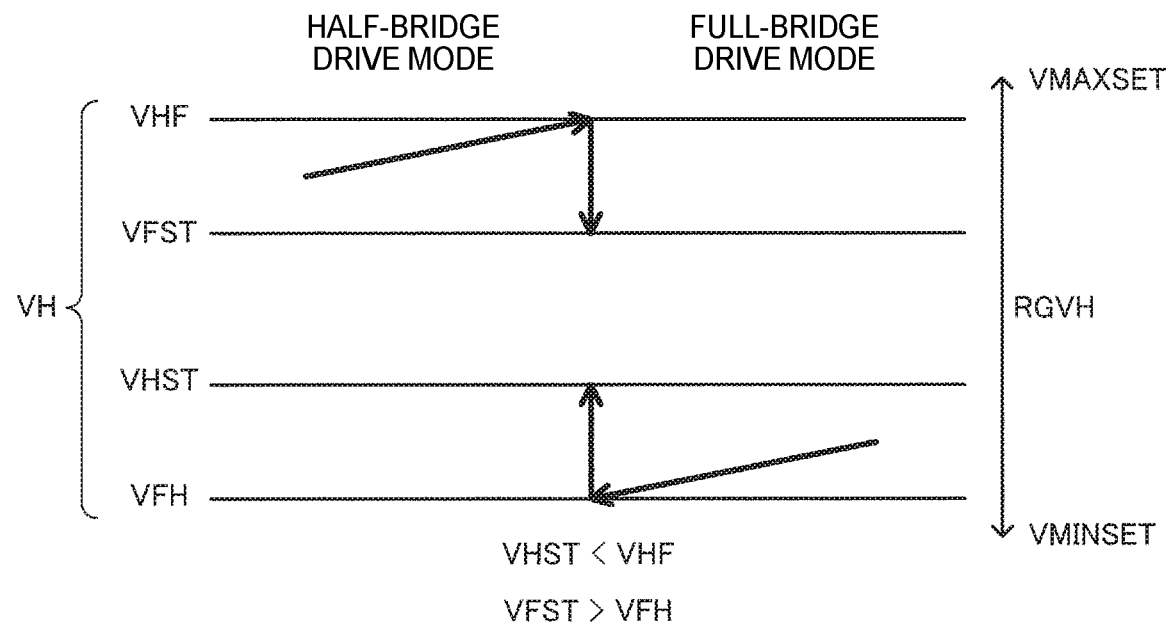
FIG. 9 is a diagram illustrating a potential relationship between voltages VHF, VFST, VFH, and VHST.

FIG. 9 is a diagram illustrating a potential relationship between the threshold voltages VHF and VFH for switching the drive mode, and the start voltages VFST and VHST at the time of switching. In the present embodiment, as indicated by G2 in FIG. 8, when the power supply voltage VH has decreased below the threshold voltage VFH in the full-bridge drive mode, the drive mode is switched from the full-bridge drive mode to the half-bridge drive mode. Also, as indicated by G5, when the power supply voltage VH has increased above the threshold voltage VHF in the half-bridge drive mode, the drive mode is switched from the half-bridge drive mode to the full-bridge drive mode. Also, as indicated by G7 in FIG. 8, before the drive mode is switched from the full-bridge drive mode to the half-bridge drive mode, the power supply voltage VH is set to the voltage VHST that is higher than the threshold voltage VFH. Here, in the present embodiment, the voltages are set such that the relationship VHST<VHF is satisfied, as shown in FIG. 9. That is, in the present embodiment, the power supply voltage VH is increased from the threshold voltage VFH to the voltage VHST before the drive mode is switched from the full-bridge drive mode to the half-bridge drive mode, but if the voltage VHST is higher than the threshold voltage VHF, the drive mode is switched from the half-bridge drive mode to the full-bridge drive mode. As a result, a failure occurs in that the drive mode is alternatingly switched such as in a case where immediately after the drive mode has been switched from the full-bridge drive mode to the half-bridge drive mode, the drive mode is switched from the half-bridge drive mode to the full-bridge drive mode. In this regard, as a result of setting the potential relationship VHST<VHF, as described above, occurrence of such a failure can be prevented. Note that a voltage range RGVH in FIG. 9 is a set voltage range of the power supply voltage VH.

Also, in the present embodiment, as indicated by G9 in FIG. 8, before the drive mode is switched from the half-bridge drive mode to the full-bridge drive mode, the power supply voltage VH is set to the voltage VFST that is lower than the threshold voltage VHF. Here, in the present embodiment, the voltages are set such that the relationship VFST>VFH is satisfied, as shown in FIG. 9. That is, in the present embodiment, the power supply voltage VH in decreased from the threshold voltage VHF to the voltage VFST before the drive mode is switched from the half-bridge drive mode to the full-bridge drive mode, but if the voltage VFST is lower than the threshold voltage VFH, the drive mode is switched from the full-bridge drive mode to the half-bridge drive mode. As a result, a failure occurs in that the drive mode is alternatingly switched such as in a case where immediately after the drive mode has switched from the half-bridge drive mode to the full-bridge drive mode, the drive mode switches from the full-bridge drive mode to the half-bridge drive mode. In this regard, as a result of setting the potential relationship VFST>VFH is set, as described above, occurrence of such a failure can be prevented.

FIG. 10 shows an exemplary setting of the register 28 in FIG. 1. VMINSET indicates a minimum set voltage of the power supply voltage VH, which is a drive voltage, and VMAXSET indicates a maximum set voltage of the power supply voltage VH. The voltage range from VMINSET to VMAXSET corresponds to the voltage range RGVH in FIG. 9, and the power supply voltage VH takes a voltage in the voltage range RGVH, which is from VMINSET to VMAXSET. That is, the power supply voltage VH is variably controlled in the voltage range RGVH based on the rectified voltage information.

Also, the threshold voltages VFH and VHF for switching the drive mode, which are described in FIGS. 8 and 9, and voltages VHST and VFST, which are start voltages when the mode is switched, can be set to the register 28. The control circuit 24 controls switching between the full-bridge drive mode and the half-bridge drive mode using the voltages VFH, VHF, VHST, and VFST that are set in the register 28. That is, the control circuit 24 controls switching of the drive mode based on the values set to the register 28 by a user who uses the control device 20.

Note that AUTOEN in FIG. 10 indicates a bit for setting ON/OFF of automatic switching between the full-bridge drive mode and the half-bridge drive mode. Also, as shown in FIG. 9, the threshold voltage VFH is set to a voltage that is close to the minimum set voltage VMINSET corresponding to a lower limit of the voltage range RGVH. On the other hand, the threshold voltage VHF is set to a voltage that is close to the maximum set voltage VMAXSET corresponding to an upper limit of the voltage range RGVH.

Figure 11:
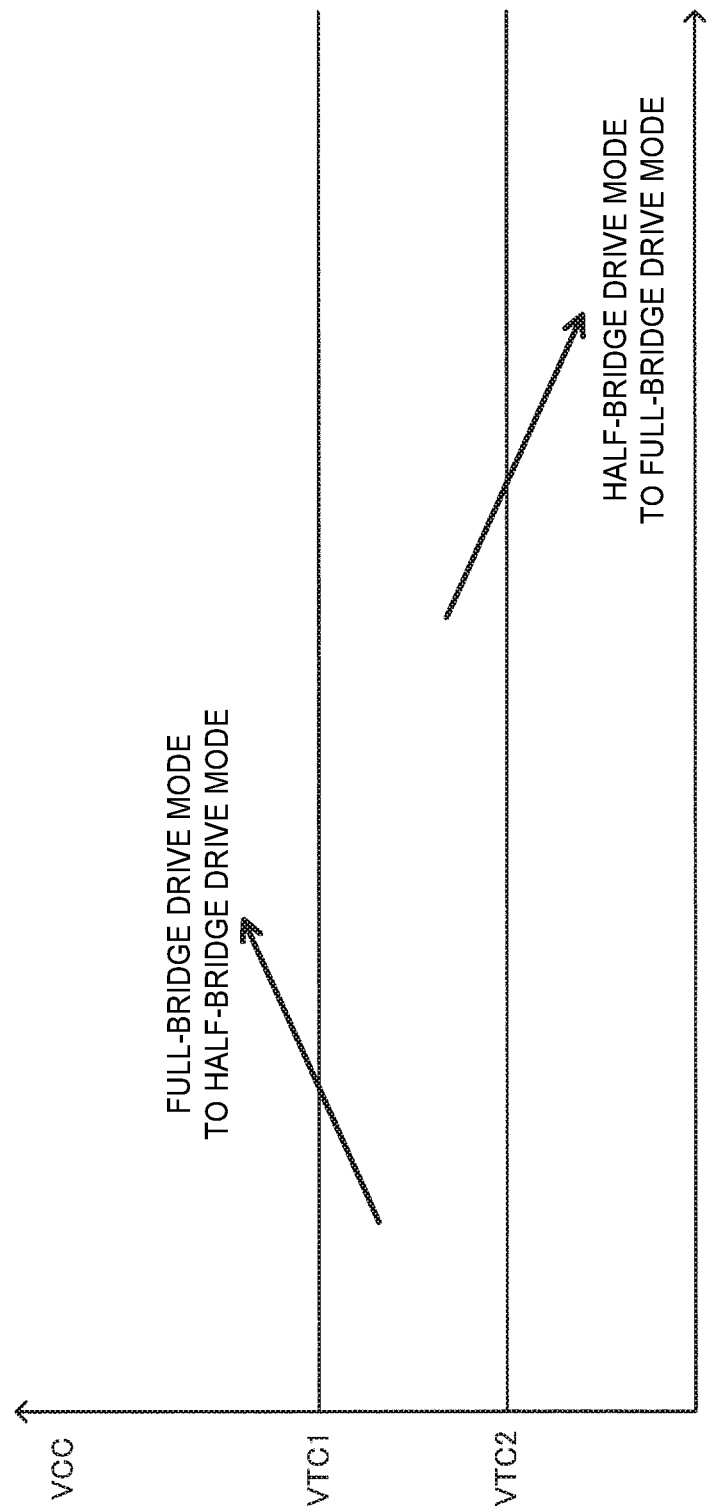
FIG. 11 is a diagram illustrating a method of switching between the full-bridge drive mode and the half-bridge drive mode based on a rectified voltage.

A method of switching between the full-bridge drive mode and the half-bridge drive mode based on the power supply voltage VH, of the power transmission driver 18, that changes in accordance with the rectified voltage information has been mainly described, but the present embodiment is not limited thereto. For example, in FIG. 11, the control circuit 24 switches the drive mode from the full-bridge drive mode to the half-bridge drive mode when the rectified voltage VCC indicated by the rectified voltage information has increased above a rectification threshold voltage VTC1. Also, the control circuit 24 switches the drive mode from the half-bridge drive mode to the full-bridge drive mode when the rectified voltage VCC indicated by the rectified voltage information has decreased below a rectification threshold voltage VTC2, which is lower than the rectification threshold voltage VTC1. Here, the rectification threshold voltages VTC1 and VTC2 are respectively a first rectification threshold voltage and a second rectification threshold voltage.

Accordingly, when the rectified voltage VCC has increased due to the decrease in the distance between the coils, for example, and the rectified voltage VCC has increased above the rectification threshold voltage VTC1, the drive mode of the power transmission driver 18 is switched from the full-bridge drive mode to the half-bridge drive mode. With this, heat generation on the power receiving side can be suppressed, which is caused by surplus power occurring due to the reduction in the distance between the coils. Also, when the rectified voltage VCC has decreased due to the increase in the distance between the coils or the like, and the rectified voltage VCC has decreased below the rectification threshold voltage VTC2, the drive mode of the power transmission driver 18 is switched from the half-bridge drive mode to the full-bridge drive mode. With this, when the distance between the coils increases, the primary coil L1 is driven in the full-bridge drive mode in which the power transmission capability is high, and the degree of positional freedom can be improved.

Figure 12:
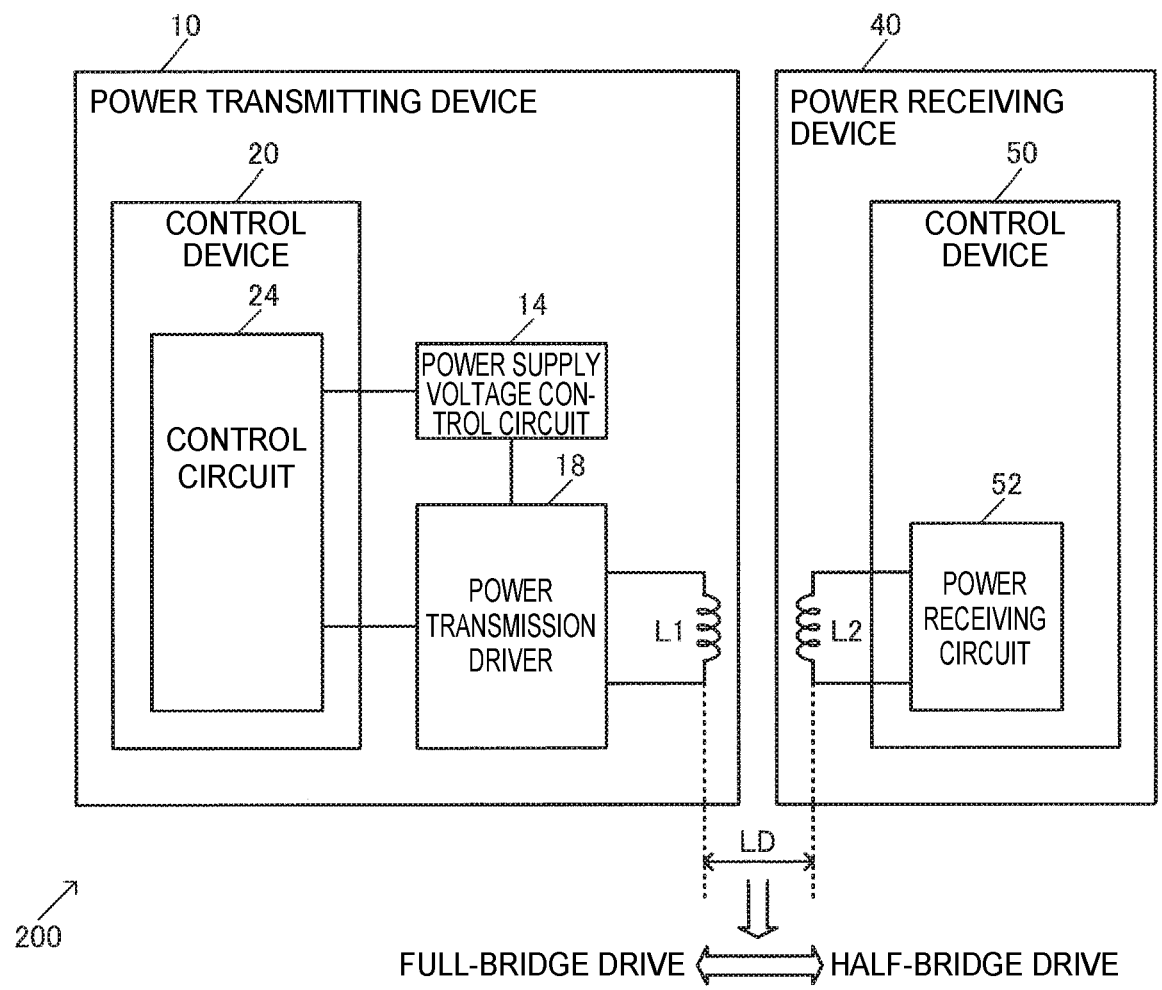
FIG. 12 is a diagram illustrating a method of switching between the full-bridge drive mode and the half-bridge drive mode in accordance with distance information.

Also, a case where the rectified voltage information is used as the distance information indicating the distance between the coils, and the drive mode is switched between the full-bridge drive mode and the half-bridge drive mode in accordance with the rectified voltage information has been described above, but the present embodiment is not limited thereto. Information other than the rectified voltage information may be used as the information indicating the distance between the coils. For example, in FIG. 12, the control device 20 on the transmitting side that controls the power transmission driver 18 and the power supply voltage control circuit 14 includes the control circuit 24, and the power transmission driver 18 is configured to be switchable between the full-bridge drive mode and the half-bridge drive mode. Also, the control circuit 24 switches the drive mode between the full-bridge drive mode and the half-bridge drive mode in accordance with distance information indicating the distance between the coils LD between the primary coil L1 and the secondary coil L2 for receiving power that is provided in the power receiving device 40 that receives power from the power transmission driver 18. As the distance information indicating the distance between the coils LD, the rectified voltage information may be used, or another information may be used. For example, a configuration may be adopted in which the distance between the coils LD is obtained using a distance detection device, and the control of switching between the full-bridge drive mode and the half-bridge drive mode is performed based on the distance between the coils LD itself. A ranging sensor may be used as the distance detection device, or the distance between the coils LD may be obtained using radio wave intensity that is measured when a proximity wireless communication device is used. As a result of using the distance information in this way, control can be performed such that the primary coil L1 is driven in the full-bridge drive mode when the distance between the coils LD is large, for example, and as a result, the degree of positional freedom can be improved. On the other hand, if the distance between the coils LD is small, as a result of driving the primary coil L1 in the half-bridge drive mode, heat generation due to surplus power can be suppressed.

3. Detailed Example

Figure 13:
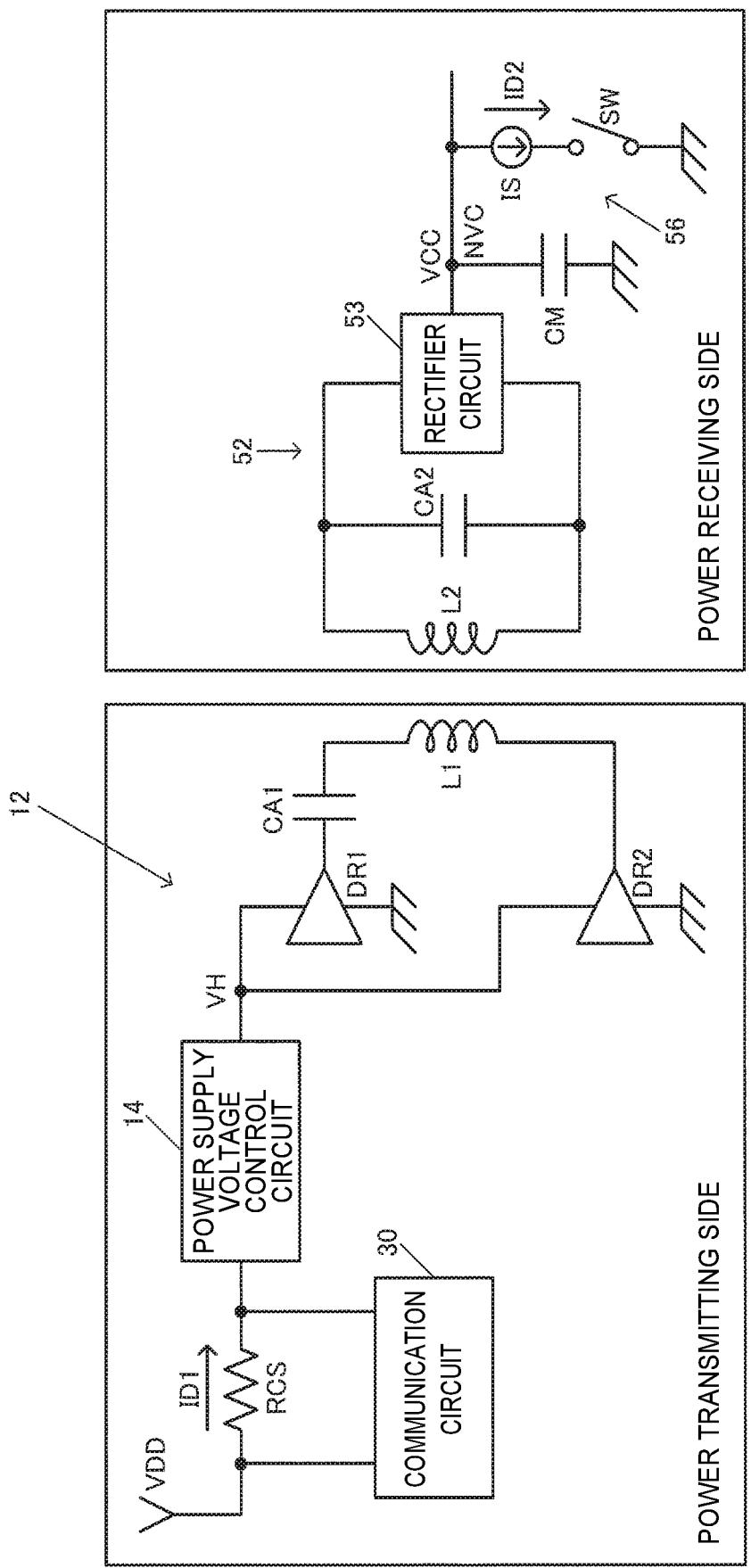
FIG. 13 is a diagram illustrating a communication method using a load modulation.

Next, a detailed example of the present embodiment will be described. FIG. 13 is a diagram illustrating a detailed communication method using a load modulation. As shown in FIG. 13, on the power transmitting side, power transmission drivers DR1 and DR2 operate based on the power supply voltage VH supplied from the power supply voltage control circuit 14, and drive the primary coil L1. The power transmission driver DR1 is realized by the transistors TA1 and TA2 in FIG. 4, and the power transmission driver DR2 is realized by the transistors TA3 and TA4. On the other hand, on the power receiving side, the rectifier circuit 53 of the power receiving circuit 52 rectifies a coil end voltage of the secondary coil L2, and outputs the rectified voltage VCC to a node NVC. Note that a resonance circuit on the power transmitting side is constituted by the primary coil L1 and the capacitor CA1, and a resonance circuit on the power receiving side is constituted by the secondary coil L2 and a capacitor CA2.

On the power receiving side, the load state on the power receiving side is changed by causing a current ID2 of a current source IS to intermittently flow from the node NVC to GND, by turning on and off a switching element SW of the load modulation circuit 56. On the power transmitting side, a current ID1 flowing through a sense resistor RCS provided in a power supply line changes due to the change in the load state on the power receiving side by load modulation. For example, the sense resistor RCS for detecting a current flowing in the power supply is provided between the VDD power supply on the power transmitting side and the power supply voltage control circuit 14. The power supply voltage control circuit 14 is supplied with the power supply voltage from the power supply via the sense resistor RCS. Also, the current ID1 flowing from the power supply to the sense resistor RCS changes due to the change in the load state on the power receiving side by load modulation, and the communication circuit 30 detects this change in the current. Also, the communication circuit 30 performs processing for detecting communication data transmitted by load modulation based on the detection result.

Figure 14:
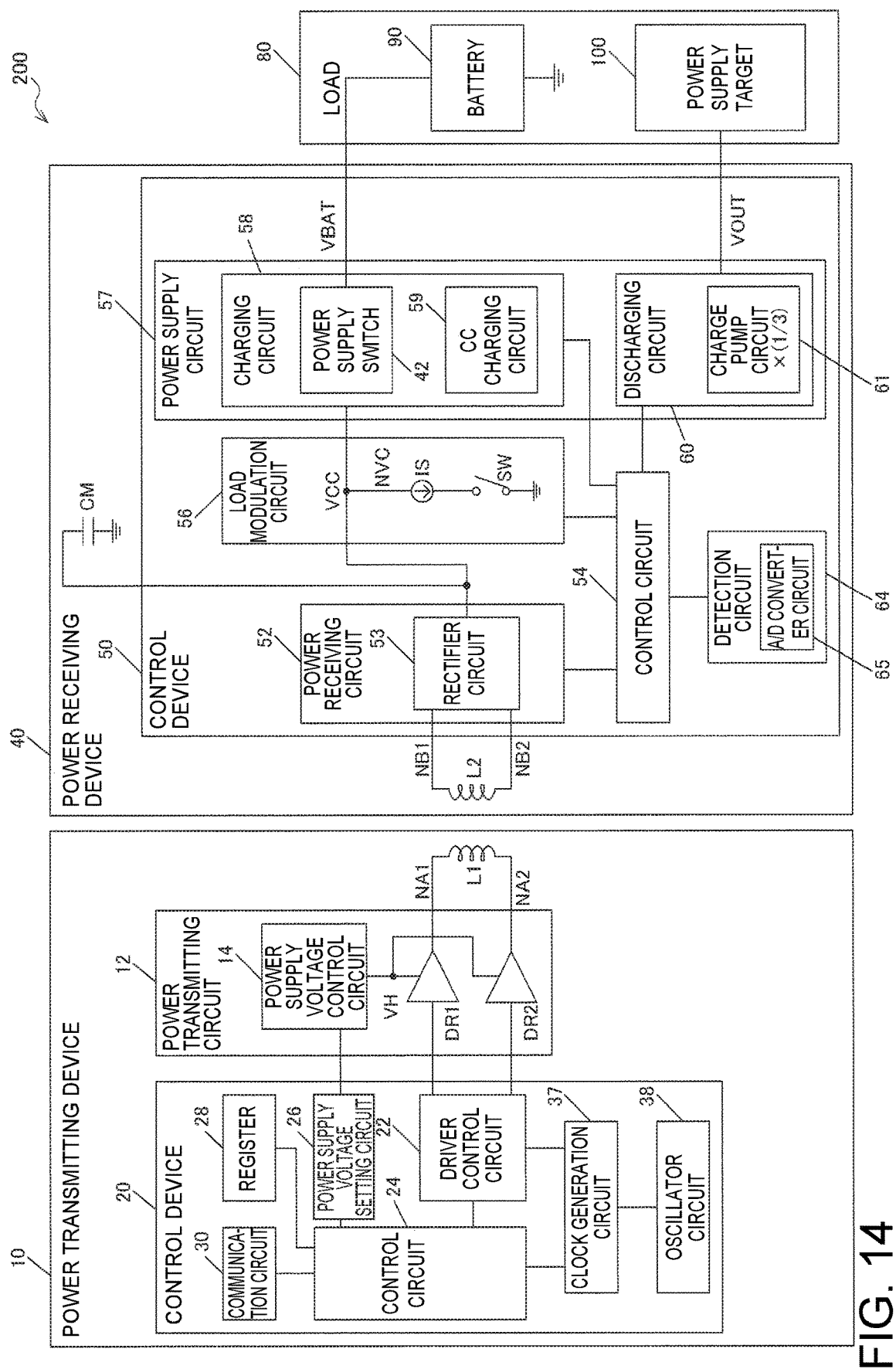
FIG. 14 shows a detailed exemplary configuration of control devices on a power transmitting side and a power receiving side, and the power transmitting device and a power receiving device including the respective control devices.

FIG. 14 shows a detailed exemplary configuration of the control devices 20 and 50, and the power transmitting device 10 and the power receiving device 40 including the respective control devices. In FIG. 14, the power receiving device 40 supplies power to a load 80 based on power received from the power transmitting device 10. The load 80 may include a battery 90 and a power supply target 100, for example.

A power transmission transformer is formed when the primary coil L1 is electromagnetically coupled to the secondary coil L2. When power needs to be transmitted, the electronic apparatuses 510 and 512 are placed on the charger 500 as shown in FIG. 3 so as to achieve a state in which a magnetic flux of the primary coil L1 passes through the secondary coil L2. On the other hand, when power need not be transmitted, the electronic apparatuses 510 and 512 are physically separated from the charger 500 so as to achieve a state in which the magnetic flux of the primary coil L1 does not pass through the secondary coil L2.

The power transmitting circuit 12 includes the power transmission driver DR1 that drives one end of the primary coil L1, the power transmission driver DR2 that drives the other end of the primary coil L1, and the power supply voltage control circuit 14. Also, the power transmitting circuit 12 may include at least one capacitor that forms a resonance circuit with the primary coil L1. The power transmission drivers DR1 and DR2 are each realized by an inverter circuit constituted by power MOS transistors, for example. These power transmission drivers DR1 and DR2 are controlled by the driver control circuit 22 of the control device 20. That is, the control circuit 24 controls the power transmitting circuit 12 via the driver control circuit 22.

The power supply voltage control circuit 14 controls the power supply voltage VH, which is a drive voltage to be supplied to the power transmission drivers DR1 and DR2. For example, the control circuit 24 controls the power supply voltage control circuit 14 based on communication data received from the power receiving side. With this, the power supply voltage VH to be supplied to the power transmission drivers DR1 and DR2 is controlled, and variable control of the transmitting power can be realized, for example. The power supply voltage control circuit 14 can be realized by a DC/DC converter or the like. That is, the power supply voltage control circuit 14 generates the power supply voltage VH for the power transmission drivers by performing an operation for stepping-up the power supply voltage from the power supply, and supplies the power supply voltage VH to the power transmission drivers DR1 and DR2.

The control device 20 on the transmitting side performs various types of control on the power transmitting side, and is realized by an integrated circuit device, which is a semiconductor IC, or the like. The control device 20 includes the driver control circuit 22, the control circuit 24, a power supply voltage setting circuit 26, the register 28, the communication circuit 30, a clock generation circuit 37, and an oscillator circuit 38. Note that modifications such as the control device 20 incorporating the power transmitting circuit 12 can be implemented.

The driver control circuit 22, which is a pre-driver, controls the power transmission drivers DR1 and DR2. For example, the driver control circuit 22 outputs control signals to gates of the transistors that constitute the power transmission drivers DR1 and DR2. The power transmission drivers DR1 and DR2 drive the primary coil L1 by applying a drive signal to the primary coil L1 based on the control signals. The oscillator circuit 38 is constituted by a crystal-oscillator circuit, for example, and generates a clock signal on a primary side. The clock generation circuit 37 generates a drive clock signal for defining a power transmission frequency, which is a drive frequency, and the like. Then, the driver control circuit 22 generates a control signal at a given power transmission frequency based on the drive clock signal, a control signal from the control circuit 24, and the like, and controls the power transmission drivers DR1 and DR2 of the power transmitting circuit 12 by outputting the control signal at the given power transmission frequency to the power transmission drivers DR1 and DR2.

The control device 50 on the receiving side performs various types of control on the power receiving side, and is realized by an integrated circuit device, which is a semiconductor IC, or the like. The control device 50 includes the power receiving circuit 52, the control circuit 54, the load modulation circuit 56, a power supply circuit 57, and a detection circuit 64. Note that modifications such as the power receiving circuit 52 being provided outside the control device 50 can be implemented.

The power receiving circuit 52 receives power from the power transmitting device 10. Specifically, the power receiving circuit 52 includes the rectifier circuit 53 that is constituted by a plurality of transistors and diodes, and the like. The rectifier circuit 53 converts an AC voltage induced in the secondary coil L2 to a DC rectified voltage VCC, and outputs the rectified voltage VCC.

The load modulation circuit 56 performs load modulation. For example, the load modulation circuit 56 includes a current source IS, and performs load modulation using the current source IS. Specifically, the load modulation circuit 56 includes the current source IS and a switching element SW. The current source IS and the switching element SW are provided in series between a node NVC of the rectified voltage VCC and a GND node, for example. The switching element SW is turned on and off based on a control signal from the control circuit 54, for example, and a current of the current source IS that flows from the node NVC to GND is allowed to flow or cut off, and thereby the load modulation is realized. The switching element SW can be realized by a MOS transistor or the like. Note that the load modulation circuit 56 is not limited to the configuration in FIG. 14, and various modifications such as using a resistor instead of the current source IS can be implemented, for example.

Note that the communication method of the power receiving device 40 is not limited to load modulation. For example, the power receiving device 40 may perform communication with a method other than the load modulation using the primary coil L1 and the secondary coil L2. Alternatively, a configuration may be adopted in which coils are provided that are separate from the primary coil L1 and the secondary coil L2, and a communication is performed by load modulation or with another communication method using these separate coils. Alternatively, communication may be performed with proximity wireless communication such as RF.

The power supply circuit 57 supplies power to the load 80 based on power received by the power receiving circuit 52. For example, the power supply circuit 57 charges the battery 90 by supplying power received by the power receiving circuit 52. Alternatively, the power supply circuit 57 supplies power from the battery 90 or power received by the power receiving circuit 52 to the power supply target 100. Specifically, the power supply circuit 57 includes a charging circuit 58 and a discharging circuit 60. The charging circuit 58 includes a power supply switch 42 and a CC charging circuit 59, and charges the battery 90. For example, the charging circuit 58 is supplied with a voltage based on the rectified voltage VCC from the power receiving circuit 52, and charges the battery 90. The discharging circuit 60 includes a charge pump circuit 61, and performs a discharging operation for discharging the battery 90.

The detection circuit 64 includes an A/D converter circuit 65, and performs various types of detection processing. For example, processing for detecting over-discharge, over-voltage, over-current, or abnormal temperature is envisioned as the detection processing performed by the detection circuit 64.

The control circuit 54 executes various types of control processing on the units of the control device 50 on the power receiving side. The control circuit 54 can be realized by a logic circuit such as a gate array that is designed using an automated placement and routing method, or various processors such as a microcomputer, for example.

The load 80 includes the battery 90 and the power supply target 100. The power supply target 100 is provided in an electronic apparatus in which the power receiving device 40 is incorporated, and is a device that is supplied with power from the battery 90, for example. Note that power received by the power receiving circuit 52 may be directly supplied to the power supply target 100.

Figure 15:
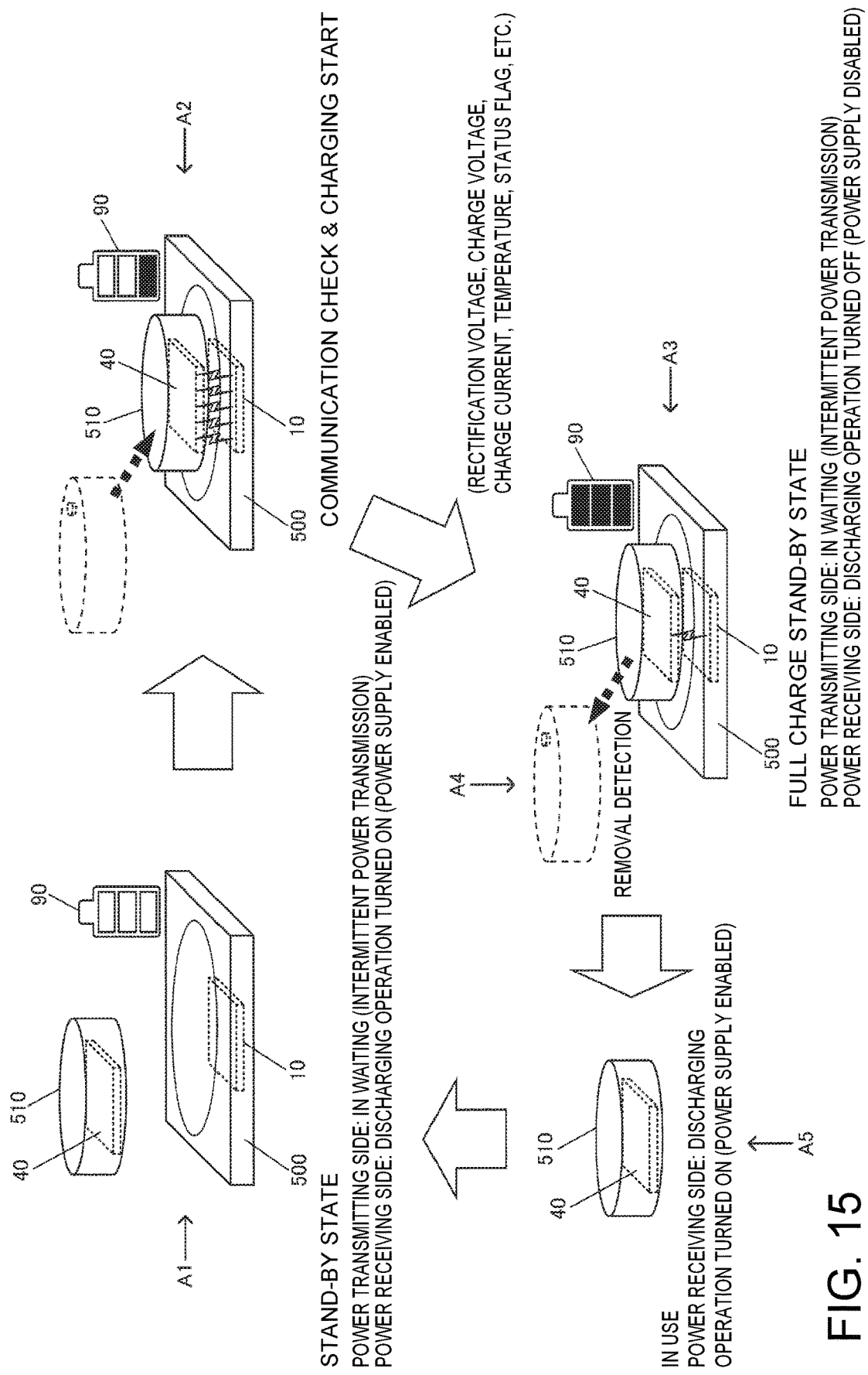
FIG. 15 is a diagram illustrating an outline of the operation sequence of the contactless power transmission system.

Next, an example of an operation sequence of the contactless power transmission system 200 of the present embodiment will be described. FIG. 15 is a diagram illustrating an outline of the operation sequence.

In A1 in FIG. 15, the electronic apparatus 510 including the power receiving device 40 is not placed on the charger 500 that includes the power transmitting device 10, and is in a removed state. In this case, a stand-by state is realized. In the stand-by state, the power transmitting circuit 12 of the power transmitting device 10 enters a state of detecting landing of the electronic apparatus 510 by performing intermittent power transmission for landing detection. Also, in the stand-by state, the operation for discharging to the power supply target 100 is turned on in the power receiving device 40, and power supply to the power supply target 100 is enabled. Accordingly, the power supply target 100 such as a processing circuit is supplied with power from the battery 90, and can operate.

As shown in A2 in FIG. 15, when the electronic apparatus 510 is placed on the charger 500, and landing is detected, a communication check & charge state is realized. In the communication check & charge state, the power transmitting circuit 12 of the power transmitting device 10 performs normal power transmission, which is continuous power transmission. Here, the power transmitting circuit 12 performs normal power transmission, while performing power control such that power variably changes according to the state of power transmission. Also, control based on the charging state of the battery 90 is performed. The state of power transmission is a state determined by the positional relationship between the primary coil L1 and the secondary coil L2 such as the distance between the coils, for example, and can be determined based on information regarding the rectified voltage VCC of the power receiving circuit 52 or the like, for example. The charging state of the battery 90 can be determined based on information regarding the battery voltage VBAT, for example.

Also, in the communication check & charge state, the charging operation of the charging circuit 58 of the power receiving device 40 is turned on, and the battery 90 is charged based on power received by the power receiving circuit 52. Also, the discharging operation of the discharging circuit 60 is turned off, and power from the battery 90 is not supplied to the power supply target 100. Also, in the communication check & charge state, communication data is transmitted to the power transmitting side by load modulation performed by the load modulation circuit 56. For example, communication data including power transmission status information, charge state information, and information regarding temperature and the like are transmitted from the power receiving side to the power transmitting side by regular load modulation in a normal power transmission period.

As shown in A3 in FIG. 15, when full charge of the battery 90 is detected, a full charge stand-by state is realized. In the full charge stand-by state, the power transmitting circuit 12 enters a state in which intermittent power transmission for removal detection is performed so as to detect removal of the electronic apparatus 510, for example. Also, the discharging operation of the discharging circuit 60 remains off, and the power supply to the power supply target 100 remains disabled.

As shown in A4 in FIG. 15, when removal of the electronic apparatus 510 is detected, the electronic apparatus 510 enters a use state, and the discharging operation on the power receiving side is turned on, as shown in A5 in FIG. 15. Specifically, the discharging operation of the discharging circuit 60 is switched from OFF to ON, and power from the battery 90 is supplied to the power supply target 100 via the discharging circuit 60. Accordingly, power from the battery 90 is supplied, the power supply target 100 such as a processing circuit operates with the power, and the electronic apparatus 510 enters a state in which a user can use it normally.

Also, in the present embodiment, the control circuit 24 on the power transmitting side performs the landing detection shown in A1 and A2 in FIG. 15, and removal detection shown in A3 and A4 in the full-bridge drive mode. For example, the landing detection and the removal detection are performed, while performing intermittent power transmission in the full-bridge drive mode. If the landing detection and the removal detection are performed in the full-bridge drive mode in which the power transmission capability is high, in this way, the landing detection and the removal detection can be executed in a state in which the degree of positional freedom with respect to the distance between the coils is high. Therefore, reliable landing detection and removal detection can be realized in a wider distance range, and even in a state in which, in FIG. 3, the electronic apparatuses 510 and 512 are separated from the charger 500, for example, appropriate landing detection and removal detection can be performed. Also, the landing detection and the removal detection is performed using intermittent power transmission in which power is intermittently transmitted, and the period in which power is transmitted is short, and as a result, there is an advantage that, even in the full-bridge drive mode in which large power is transmitted, heat generation on the power receiving side can be suppressed, and the influence of heat generation is small.

As described above, the control device of the present embodiment is used in a power transmitting device that includes a power transmission driver and a power supply voltage control circuit that supplies a power supply voltage to the power transmission driver, and controls the power transmission driver and the power supply voltage control circuit. The power transmission driver transmits power to a power receiving device that includes a secondary coil for receiving power and a rectifier circuit that is connected to the secondary coil and generates a rectified voltage by outputting a drive signal to a primary coil for transmitting power. Also, the control device includes a communication circuit for receiving rectified voltage information, which is information of the rectified voltage, and a control circuit that switches the drive mode of the power transmission driver between a full-bridge drive mode and a half-bridge drive mode in accordance with the rectified voltage information.

According to the present embodiment, the control device is used in the power transmitting device that includes the power transmission driver and the power supply voltage control circuit, and the power transmission driver is configured to be switchable between the full-bridge drive mode and the half-bridge drive mode, and transmits power to the power receiving device that includes the secondary coil and the rectifier circuit. Also, the control circuit switches the drive mode between the full-bridge drive mode and the half-bridge drive mode in accordance with the rectified voltage information, which is information of the rectified voltage. In this way, the drive mode can be switched between the full-bridge drive mode in which power transmission capability is high and the degree of positional freedom with respect to the distance between the coils can be increased, and the half-bridge drive mode in which power transmission capability is low, and heat generation on the power receiving side can be suppressed, in accordance with the rectified voltage information received from the power receiving device. Therefore, a control device or the like with which the degree of positional freedom can be improved and heat generation on the power receiving side can be suppressed can be provided.

Also, in the present embodiment, the control circuit may control the power supply voltage of the power transmission driver in accordance with the rectified voltage information, and switch the drive mode between the full-bridge drive mode and the half-bridge drive mode based on the power supply voltage.

In this way, control of switching between the full-bridge drive mode and the half-bridge drive mode can be performed by monitoring the power supply voltage of the power transmission driver that is controlled in accordance with the rectified voltage information, and as a result, control of switching the drive mode can be appropriately performed with simple control processing.

Also, in the present embodiment, the control circuit may switch, in the full-bridge drive mode, the drive mode from the full-bridge drive mode to the half-bridge drive mode when the power supply voltage has decreased below a first threshold voltage.

In this way, control of switching the drive mode from the full-bridge drive mode to the half-bridge drive mode can be realized by monitoring the power supply voltage that decreases when the distance between the coils decreases.

Also, in the present embodiment, the control circuit may set the power supply voltage to a first voltage that is higher than the first threshold voltage before switching the drive mode from the full-bridge drive mode to the half-bridge drive mode.

In this way, a situation can be suppressed in which the rectified voltage suddenly decreases immediately after the drive mode has been switched from the full-bridge drive mode to the half-bridge drive mode.

Also, in the present embodiment, the control circuit may switch, in the half-bridge drive mode, the drive mode from the half-bridge drive mode to the full-bridge drive mode when the power supply voltage has increased above a second threshold voltage. For example, in the present embodiment, the control circuit may switch the drive mode from the half-bridge drive mode to the full-bridge drive mode when, in the half-bridge drive mode, the power supply voltage has increased above the second threshold voltage that is higher than the first threshold voltage.

In this way, control of switching the drive mode from the half-bridge drive mode to the full-bridge drive mode can be realized by monitoring the power supply voltage that increases as the distance between the coils increases.

Also, in the present embodiment, the control circuit may set the power supply voltage to a second voltage that is lower than the second threshold voltage before switching the drive mode from the half-bridge drive mode to the full-bridge drive mode.

In this way, a situation can be suppressed in which the rectified voltage suddenly increases immediately after the drive mode has been switched from the half-bridge drive mode to the full-bridge drive mode.

Also, in the present embodiment, the control circuit switches the drive mode from the full-bridge drive mode to the half-bridge drive mode when, in the full-bridge drive mode, the power supply voltage has decreased below the first threshold voltage, and switches the drive mode from the half-bridge drive mode to the full-bridge drive mode when, in the half-bridge drive mode, the power supply voltage has increased above the second threshold voltage. Also, the control circuit sets the power supply voltage to the first voltage that is higher than the first threshold voltage before switching the drive mode from the full-bridge drive mode to the half-bridge drive mode. Also, VHST<VHF may be set. Here, VHF is the second threshold voltage, and VHST is the first voltage.

For example, if VHST, which is the first voltage, is higher than VHF, which is the second threshold voltage, a situation may arise in which immediately after the drive mode has been switched from the full-bridge drive mode to the half-bridge drive mode, the drive mode is switched from the half-bridge drive mode to the full-bridge drive mode. In this regard, as a result of VHST<VHF being set, such a situation can be prevented from occurring.

Also, in the present embodiment, the control circuit switches the drive mode from the full-bridge drive mode to the half-bridge drive mode when, in the full-bridge drive mode, the power supply voltage has decreased below the first threshold voltage, and switches the drive mode from the half-bridge drive mode to the full-bridge drive mode when, in the half-bridge drive mode, the power supply voltage has increased above the second threshold voltage. Also, the control circuit sets the power supply voltage to the second voltage that is lower than the second threshold voltage before switching the drive mode from the half-bridge drive mode to the full-bridge drive mode. Also, VFST>VFH may be set. Here, VFH is the first threshold voltage, and VFST is the second voltage.

For example, if VFST, which is the second voltage, is higher than VFH, which is the first threshold voltage, a situation may arise in which immediately after the drive mode has been switched from the half-bridge drive mode to the full-bridge drive mode, the drive mode is switched from the full-bridge drive mode to the half-bridge drive mode. In this regard, as a result of VFST>VFH being set, such situation can be prevented from occurring.

Also, in the present embodiment, the control circuit may switch the drive mode from the full-bridge drive mode to the half-bridge drive mode when, in the full-bridge drive mode, the rectified voltage has increased above the first rectification threshold voltage, and switch the drive mode from the half-bridge drive mode to the full-bridge drive mode when, in the half-bridge drive mode, the rectified voltage has decreased below the second rectification threshold voltage that is lower than the first rectification threshold voltage.

In this way, the drive mode is switched from the full-bridge drive mode to the half-bridge drive mode when the rectified voltage has increased above the first rectification threshold voltage, and as a result, heat generation or the like can be suppressed. Also, the drive mode is switched from the half-bridge drive mode to the full-bridge drive mode when the rectified voltage has decreased below the second rectification threshold voltage, and as a result, the degree of positional freedom can be improved.

Also, the control device of the present embodiment is used in a power transmitting device that includes a power transmission driver and a power supply voltage control circuit that supplies a power supply voltage to the power transmission driver, and controls the power transmission driver and the power supply voltage control circuit. The power transmission driver transmits power to a power receiving device including a secondary coil for receiving power by outputting a drive signal to a primary coil for transmitting power. Also, the control device includes a control circuit that switches the drive mode of the power transmission driver between the full-bridge drive mode and the half-bridge drive mode in accordance with distance information that indicates the distance between the primary coil and the secondary coil.

According to the present embodiment, the control circuit is configured to control the power transmission driver and the power supply voltage control circuit, and the power transmission driver is configured to be switchable between the full-bridge drive mode and the half-bridge drive mode. Also, the control circuit switches the drive mode between the full-bridge drive mode and the half-bridge drive mode in accordance with distance information that indicates the distance between the primary coil and the secondary coil. In this way, the drive mode can be switched between the full-bridge drive mode in which power transmission capability is high and the degree of positional freedom with respect to the distance between the coils can be improved, and the half-bridge drive mode in which power transmission capability is low, and heat generation on the power receiving side can be suppressed, in accordance with the distance information indicating the distance between the coils. Therefore, a control device or the like with which the degree of positional freedom can be improved and heat generation on the power receiving side can be suppressed can be provided.

Also, in the present embodiment, the control circuit may perform landing detection or removal detection, in the full-bridge drive mode.

As a result of performing landing detection and removal detection in the full-bridge drive mode in which power transmission capability is high, landing detection and removal detection can be performed in a state in which the degree of positional freedom with respect to the distance between the coils is high, and reliable landing detection and removal detection can be realized in a wider distance range.

Also, in the present embodiment, the power transmission driver includes a first transistor that is connected between a high potential side power supply node and a first connection node to which one end of the primary coil is coupled, and a second transistor that is connected between the first connection node and a low potential side power supply node. Also, the power transmission driver includes a third transistor that is connected between the high potential side power supply node and a second connection node to which the other end of the primary coil is connected, and a fourth transistor that is connected between the second connection node and the low potential side power supply node. Also, the control circuit performs control, in the full-bridge drive mode, such that a drive current is caused to flow from the high potential side power supply node to the low potential side power supply node via the first transistor, the primary coil, and the fourth transistor, by turning on the first transistor and the fourth transistor in a first period. Also, the control circuit performs control such that a drive current is caused to flow from the high potential side power supply node to the low potential side power supply node via the third transistor, the primary coil, and the second transistor, by turning on the second transistor and the third transistor in a second period. On the other hand, the control circuit performs control, in the half-bridge drive mode, such that a drive current is caused to flow from the high potential side power supply node to the low potential side power supply node via the first transistor, the primary coil, and the fourth transistor, by turning on the first transistor and the fourth transistor in a third period, and turns off the first transistor and the fourth transistor in a fourth period.

In this way, the drive in the full-bridge drive mode and the drive in the half-bridge drive mode can be realized with a simple configuration and sequence, and switching between these drive modes can be realized.

Also, the present embodiment relates to a power transmitting device including the above-described control device.

Also, the present embodiment relates to a contactless power transmission system including the above-described power transmitting device and power receiving device.

Also, the power receiving device of the present embodiment receives power from a power transmitting device that includes a primary coil for transmitting power, a power transmission driver that outputs a drive signal to the primary coil, and a power supply voltage control circuit that supplies a power supply voltage to a power transmission driver. Also, the power receiving device includes a secondary coil for receiving power, a rectifier circuit that is connected to the secondary coil, and generates a rectified voltage, and a communication circuit that transmits an instruction for switching the drive mode of the power transmission driver between the full-bridge drive mode and the half-bridge drive mode according to the rectified voltage, to the power transmitting device.

According to the present embodiment, the power receiving device receives power from the power transmitting device including the power transmission driver and the power supply voltage control circuit. The power transmission driver is configured to be switchable between the full-bridge drive mode and the half-bridge drive mode. The power receiving device includes the secondary coil, the rectifier circuit that generates the rectified voltage, and the communication circuit, and the communication circuit transmits an instruction for switching the drive mode between the full-bridge drive mode and the half-bridge drive mode according to the rectified voltage to the power transmitting device. In this way, the power receiving device can transmit, to the power transmitting device, an instruction for switching, according to the rectified voltage, the drive mode between the full-bridge drive mode in which power transmission capability is high and the degree of positional freedom with respect to the distance between the coils can be improved, and the half-bridge drive mode in which power transmission capability is low and heat generation on the power receiving side can be suppressed. With this, a control device or the like with which the degree of positional freedom can be improved and heat generation on the power receiving side can be suppressed can be provided.

Also, the present embodiment relates to an electronic apparatus including the above-described control device.

Note that although an embodiment has been described in detail above, a person skilled in the art will readily appreciate that it is possible to implement numerous variations and modifications that do not depart substantially from the novel aspects and effect of the invention. Accordingly, all such variations and modifications are also to be included within the scope of the invention. For example, terms that are used within the description or drawings at least once together with broader terms or alternative synonymous terms can be replaced by those other terms at other locations as well within the description or drawings. Also, all combinations of the embodiment and variations are also encompassed in the range of the invention. Moreover, the configuration and operation of the control device, the power transmitting circuit, the power transmitting device, the power receiving device, the contactless power transmission system, the electronic apparatus, and the like are not limited to those described in the present embodiment, and various modifications are possible.

What is claimed is:

1. A control device for use in a power transmitting device that includes:
   a power transmission driver that transmits power, by outputting a drive signal to a primary coil for transmitting power, to a power receiving device including a secondary coil for receiving power and a rectifier circuit that is connected to the secondary coil and generates a rectified voltage; and
   a power supply voltage control circuit that supplies a power supply voltage to the power transmission driver, and
   for controlling the power transmission driver and the power supply voltage control circuit, the control device comprising:
   a communication circuit configured to receive rectified voltage information regarding the rectified voltage; and
   a control circuit configured to:
      control the power supply voltage of the power transmission driver in accordance with the rectified voltage information, and switch the drive mode between the full-bridge drive mode and the half-bridge drive mode based on the power supply voltage; and
      switch, in the full-bridge drive mode, the drive mode from the full-bridge drive mode to the half-bridge drive mode when the power supply voltage has decreased below a first threshold voltage.

2. The control device according to claim 1,
wherein the control circuit is configured to set the power supply voltage to a first voltage that is higher than the first threshold voltage before switching the drive mode from the full-bridge drive mode to the half-bridge drive mode.

3. The control device according to claim 1,
wherein the control circuit is configured to switch, in the half-bridge drive mode, the drive mode from the half-bridge drive mode to the full-bridge drive mode when the power supply voltage has increased above a second threshold voltage.

4. The control device according to claim 1,
wherein the control circuit is configured to switch, in the half-bridge drive mode, the drive mode from the half-bridge drive mode to the full-bridge drive mode when the power supply voltage has increased above a second threshold voltage that is higher than the first threshold voltage.

5. The control device according to claim 3,
wherein the control circuit is configured to set the power supply voltage to a second voltage that is lower than the second threshold voltage before switching the drive mode from the half-bridge drive mode to the full-bridge drive mode.

6. The control device according to claim 1, wherein the control circuit is configured to:
switch, in the half-bridge drive mode, the drive mode from the half-bridge drive mode to the full-bridge drive mode when the power supply voltage has increased above a second threshold voltage, and
set the power supply voltage to a first voltage that is higher than the first threshold voltage before switching the drive mode from the full-bridge drive mode to the half-bridge drive mode, and
VHST<VHF, wherein VHF is the second threshold voltage, and VHST is the first voltage.

7. The control device according to claim 1, wherein the control circuit is configured to:
switch, in the half-bridge drive mode, the drive mode from the half-bridge drive mode to the full-bridge drive mode when the power supply voltage has increased above a second threshold voltage, and
set the power supply voltage to a second voltage that is lower than the second threshold voltage before switching the drive mode from the half-bridge drive mode to the full-bridge drive mode, and
VFST>VFH, wherein VFH is the first threshold voltage, and VFST is the second voltage.

8. The control device according to claim 1, wherein the control circuit is configured to:
switch, in the full-bridge drive mode, the drive mode from the full-bridge drive mode to the half-bridge drive mode when the rectified voltage has increased above a first rectification threshold voltage, and
switch, in the half-bridge drive mode, the drive mode from the half-bridge drive mode to the full-bridge drive mode when the rectified voltage has decreased below a second rectification threshold voltage that is lower than the first rectification threshold voltage.

9. The control device according to claim 1,
wherein the control circuit is configured to perform landing detection or removal detection in the full-bridge drive mode.

10. The control device according to claim 1,
wherein the power transmission driver includes:
a first transistor connected between a high potential side power supply node and a first connection node to which one end of the primary coil is coupled;
a second transistor connected between the first connection node and a low potential side power supply node;
a third transistor connected between the high potential side power supply node and a second connection node to which another end of the primary coil is connected; and
a fourth transistor connected between the second connection node and the low potential side power supply node, and
the control circuit is configured to perform
control, in the full-bridge drive mode, such that a drive current is caused to flow from the high potential side power supply node to the low potential side power supply node via the first transistor, the primary coil, and the fourth transistor, by turning on the first transistor and the fourth transistor in a first period,
control such that a drive current is caused to flow from the high potential side power supply node to the low potential side power supply node via the third transistor, the primary coil, and the second transistor, by turning on the second transistor and the third transistor in a second period,
control, in the half-bridge drive mode, such that a drive current is caused to flow from the high potential side power supply node to the low potential side power supply node via the first transistor, the primary coil, and the fourth transistor, by turning on the first transistor and the fourth transistor in a third period, and
turn off the first transistor and the fourth transistor in a fourth period.

11. A power transmitting device comprising the control device according to claim 1.

12. A contactless power transmission system comprising:
the power transmitting device according to claim 11; and
the power receiving device.

13. An electronic apparatus comprising the control device according to claim 1.

14. A control device for use in a power transmitting device that includes:
a power transmission driver that transmits power, by outputting a drive signal to a primary coil for transmitting power, to a power receiving device including a secondary coil for receiving power; and
a power supply voltage control circuit that supplies a power supply voltage to the power transmission driver, and
for controlling the power transmission driver and the power supply voltage control circuit, the control device comprising:
a control circuit configured to:
determine if a distance between the primary and secondary coil is below a predetermined distance, based on distance information indicating the distance between the primary coil and the secondary coil;
switch the drive mode of the power transmission driver to a full-bridge drive mode when the distance is above the predetermined distance; and
switch the drive mode of the power transmission driver to a half-bridge drive mode when the distance is below the predetermined distance.

15. A power receiving device for receiving power from a power transmitting device including:
- a primary coil for transmitting power;
- a power transmission driver that outputs a drive signal to the primary coil; and
- a power supply voltage control circuit that supplies a power supply voltage to the power transmission driver, the power receiving device comprising:
- a secondary coil for receiving power;
- a rectifier circuit that is connected to the secondary coil and generates a rectified voltage; and
- a communication circuit configured to:
  - transmit an instruction for switching the drive mode of the power transmission driver between a full-bridge drive mode and a half-bridge drive mode according to the rectified voltage based on the power supply voltage, to the power transmitting device; and
  - transmit an instruction, in the full-bridge drive mode, for switching the drive mode from the full-bridge drive mode to the half-bridge drive mode when the power supply voltage has decreased below a first threshold voltage.

\* \* \* \* \*